(12) United States Patent
Khafizov et al.

(10) Patent No.: US 11,716,161 B2
(45) Date of Patent: Aug. 1, 2023

(54) SYSTEMS AND METHODS FOR MODIFICATION OF RADIO ACCESS NETWORK PARAMETERS BASED ON CHANNEL PROPAGATION MODELS GENERATED USING MACHINE LEARNING TECHNIQUES

(71) Applicant: Verizon Patent and Licensing Inc., Basking Ridge, NJ (US)

(72) Inventors: Farid Khafizov, Plano, TX (US); Mark Ernest Newbury, Hillsborough, NJ (US); Venkata Sambasivarao Dhulipalla, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/658,862

(22) Filed: Apr. 12, 2022

(65) Prior Publication Data
US 2022/0239395 A1 Jul. 28, 2022

Related U.S. Application Data

(63) Continuation of application No. 17/140,938, filed on Jan. 4, 2021, now Pat. No. 11,329,737.

(51) Int. Cl.
*H04B 17/391* (2015.01)
*H04W 16/22* (2009.01)
(Continued)

(52) U.S. Cl.
CPC ........ *H04B 17/3913* (2015.01); *H04W 16/22* (2013.01); *H04W 16/28* (2013.01); *H04W 52/241* (2013.01); *H04W 52/283* (2013.01)

(58) Field of Classification Search
CPC ... H04B 17/3913; H04B 17/24; H04W 16/22; H04W 16/28; H04W 52/241; H04W 52/283; H04W 24/02; H04W 52/223
See application file for complete search history.

(56) References Cited

U.S. PATENT DOCUMENTS

2010/0188997 A1 7/2010 Aoyama et al.
2014/0064227 A1* 3/2014 Zhang ............... H04W 72/0453
370/329
(Continued)

OTHER PUBLICATIONS

'LTE; Evolved Universal Terrestrial' Radio Access (E-UTRA); Physical layer procedures (3GPP TS 36.213 version 14.6.0 Release 14), ETSI TS 136 213 V14.6.0 (Apr. 2018), Apr. 2018 (available at https://www.etsi.org/deliver/etsi_ts/136200_136299/136213/14.06.00_60/ts_136213v140600p.pdf, visited Dec. 14, 2020).
(Continued)

*Primary Examiner* — Fred A Casca

(57) ABSTRACT

A system described herein may provide for the use of artificial intelligence/machine learning ("AI/ML") techniques to generate models for various locations or regions (e.g., sectors) associated with one or more radio access networks ("RANs") of a wireless network. The system may further use AI/ML techniques to generate interference models to reflect types and/or amounts of channel propagation metrics measured within the RAN. The system may further determine, based on attributes of a given sector, a sector model and/or a channel propagation model associated with the sector. Based on the sector model and/or the determined channel propagation model, one or more actions may be determined in order to enhance channel propagation metrics within the sector, such as at portions of the sector at which increased demand for wireless service is detected.

20 Claims, 13 Drawing Sheets

(51) Int. Cl.
  *H04W 52/24*   (2009.01)
  *H04W 16/28*   (2009.01)
  *H04W 52/28*   (2009.01)

(56) References Cited

U.S. PATENT DOCUMENTS

| | | | |
|---|---|---|---|
| 2014/0328188 A1* | 11/2014 | Vela | H04W 24/02 370/252 |
| 2015/0038156 A1* | 2/2015 | Kilpatrick, II | H04W 74/0833 455/561 |
| 2017/0041806 A1 | 2/2017 | Randall et al. | |
| 2017/0064591 A1* | 3/2017 | Padfield | H04W 24/06 |
| 2020/0178262 A1* | 6/2020 | Mishra | H04W 16/00 |

OTHER PUBLICATIONS

Muhammad, "Closed loop power control for LTE uplink", Blekinge Institute of Technology, Nov. 2008 (available at https://www.diva-portal.org/smash/gel/diva2:831452/FULLTEXT01.pdf, visited Dec. 14, 2020).

* cited by examiner

SYSTEMS AND METHODS FOR MODIFICATION OF RADIO ACCESS NETWORK PARAMETERS BASED ON CHANNEL PROPAGATION MODELS GENERATED USING MACHINE LEARNING TECHNIQUES

CROSS-REFERENCE TO RELATED APPLICATION

This application is a Continuation of U.S. patent application Ser. No. 17/140,938, filed on Jan. 4, 2021, titled "SYSTEMS AND METHODS FOR MODIFICATION OF RADIO ACCESS NETWORK PARAMETERS BASED ON CHANNEL PROPAGATION MODELS GENERATED USING MACHINE LEARNING TECHNIQUES," the contents of which are herein incorporated by reference in their entirety.

BACKGROUND

Wireless networks, such as Long-Term Evolution ("LTE") networks, Fifth Generation ("5G") networks, or the like, may include radio access networks ("RANs"), via which user equipment ("UE"), such as mobile telephones or other wireless communication devices, may receive wireless service. RANs, and/or portions of RANs, may have different characteristics and/or may exhibit different channel quality metrics, which may include metrics related to signal strength, interference, or the like.

DETAILED DESCRIPTION OF EXAMPLE EMBODIMENTS

Figure 1:
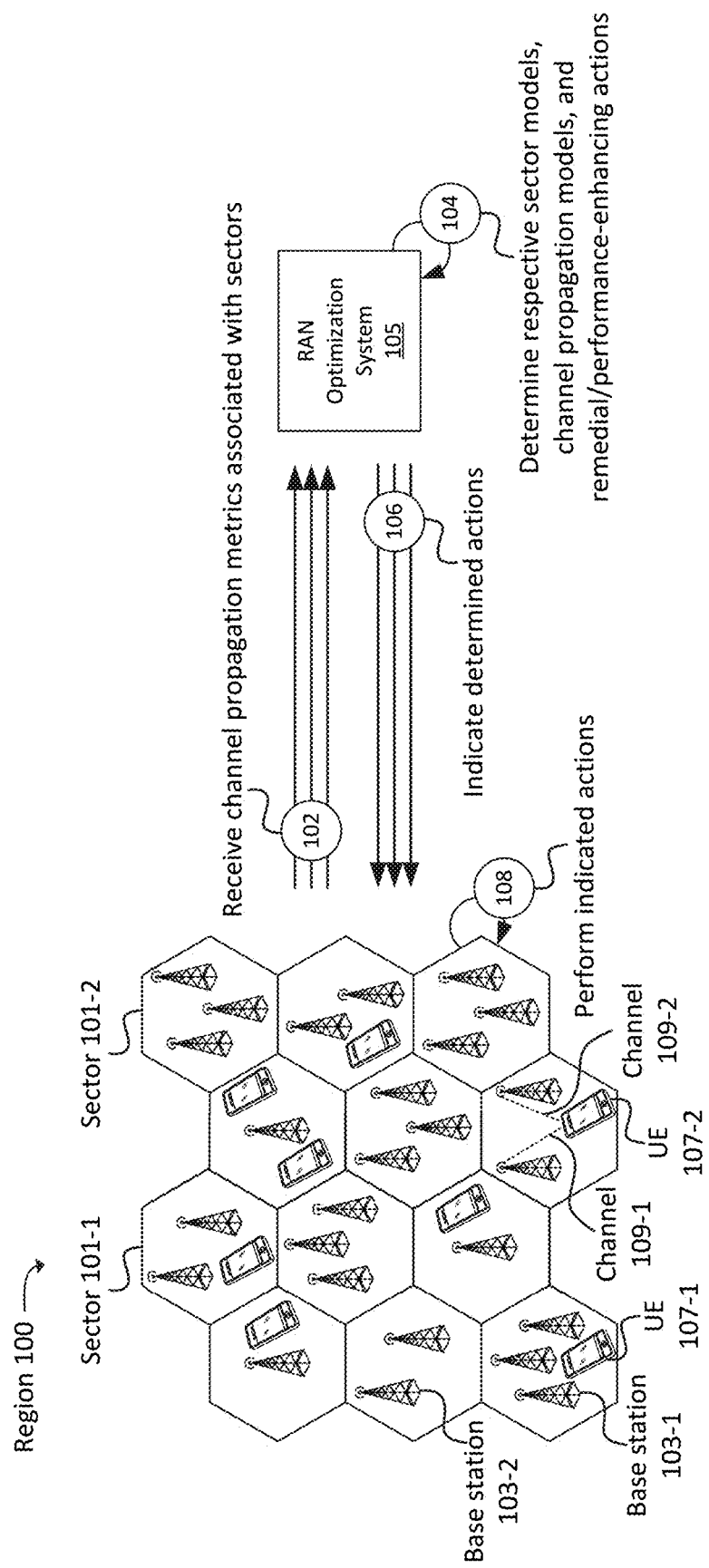
FIG. 1 illustrates an example overview of one or more embodiments described herein, in which a RAN Optimization System ("ROS") may determine a sector model, channel propagation model, and/or set of actions to perform with respect to a given sector associated with a RAN of a wireless network.

The following detailed description refers to the accompanying drawings. The same reference numbers in different drawings may identify the same or similar elements.

Embodiments described herein provide for the use of artificial intelligence/machine learning ("AI/ML") techniques or other suitable techniques to model attributes, characteristics, key performance indicators ("KPIs"), and/or other information associated with various locations or regions associated with one or more RANs of a wireless network (e.g., a LTE network, a 5G network, and/or another type of network). As discussed herein, such locations or regions may be referred to as "sectors." Further, in the examples discussed herein, sectors may include evenly distributed areas of a uniform shape (e.g., a hexagon). In practice, sectors may be arranged or defined differently. For example, in some embodiments, sectors may be defined with respect to the location of one or more base stations of a RAN (e.g., where a sector may be defined based on a coverage area of the one or more base stations and/or may be defined based on a physical location at which one or more antennas or other physical equipment of the base stations are installed), and/or may be defined independently of the location of the one or more base stations.

Embodiments described herein further provide for the use of AI/ML techniques or other suitable techniques to model, predict, and/or otherwise determine measures of radio frequency ("RF") channel propagation characteristics for sectors having particular characteristics or attributes. For example, as discussed below, one or more channel propagation models may be generated based on measured RF propagation metrics for one or more sectors, and applied to sectors sharing similar attributes as the sectors based on which the channel propagation models were generated. As described herein, the association between particular sector models, channel propagation models, and/or associated actions may be generated and/or refined using one or more AI/ML techniques or other suitable techniques (e.g., deep learning, reinforced or unreinforced machine learning, neural networks, K-means clustering, regression analysis, and/or other suitable techniques).

In this manner, RF channel propagation metrics may be predictively determined for sectors without the need to measure RF channel propagation metrics (e.g., metrics exhibited in real-world deployments and/or generated via RAN simulations). As such, RF channel quality for UEs receiving wireless service within particular locations of such sectors may be predicted and/or estimated without the need for determining RF channel metrics associated with the UEs.

Further, embodiments described herein may determine suitable remedial and/or performance-enhancing actions (referred to sometimes herein simply as "actions") to perform to enhance RF channel quality for one or more sectors. The implementation of such actions may improve RF channel quality for UEs receiving wireless service within such sectors. Further, the automated determination and implementation of such actions may improve the operation of the RAN, without requiring human intervention to select and/or implement such actions.

As shown in FIG. 1, for example, geographical area (or region) 100 may be subdivided into a set of sectors 101. The set of sectors 101 may include, as shown, sector 101-1, 101-2, and one or more additional sectors that are not explicitly illustrated with a reference numeral. Further in this example, each sector 101 may be associated with discrete network infrastructure elements, such as particular base stations 103. For example, base station 103-1 may be located in one particular sector 101, while base station 103-2 may be located in another sector 101. Further, additional base stations 103 (e.g., base stations not explicitly illustrated with a reference numeral) may be present in geographical region 100. That is, the location of each base station 103 may be within a particular geographical area (e.g., a hexagonal-shaped geographical area, in this example) that corresponds to a respective sector 101. For the sake of example, each sector 101 is associated with at least one base station 103. In practice, one or more sectors 101 may not include any base stations 103.

As shown, RAN Optimization System ("ROS") 105 may receive (at 102) channel propagation metrics associated with one or more sectors 101. The channel propagation metrics may include, for example, measures of signal quality, signal strength, propagation loss, or the like, at given sectors 101 and/or locations within sectors 101. Such measures may include and/or may be based on, for example, Reference Signal Receive Power ("RSRP") values, Received Signal Strength Indicator ("RSSI") values, Reference Signal Received Quality ("RSRQ") values, Signal-to-Interference-and-Noise-Ratio ("SINR") values, Channel Quality Indicator ("CQI") values, UE power headroom, or the like.

In some embodiments, such measures may be included in, and/or derived from, information generated by and/or received from UEs 107 located within sectors 101. For example, a given UE 107 may scan for the presence of one or more base stations 103, and may generate a measurement report including identifiers of detected base stations 103, frequencies or frequency bands on which RF signals (e.g., pilot signals, reference signals, or other RF signals) were detected from base stations 103, radio access technologies ("RATs") associated with detected RF signals (e.g., a LTE RAT, a 5G RAT, or the like), and/or one or more measures of RF signal or RF channel quality associated with the detected RF signals. For example, a given measurement report may indicate that one or more reference signals were received from a particular base station 103, and may indicate one or more channel propagation metrics (e.g., RSRP values, RSRQ values, SINR values, CQI values, or other values indicating characteristics of the detected RF signals) associated with the detected RF signals. Generally, "higher" channel propagation metrics may be associated with "stronger" or "less lossy" RF signals between a given UE 107 and base station 103 (e.g., channels 109), while "lower" channel propagation metrics may be associated with "weaker" or "more lossy" channels 109.

A "channel," as used herein, may refer to RF transmissions between a particular base station 103 and UE 107 (e.g., "downlink" RF signals transmitted from base station 103 to UE 107 and/or "uplink" RF signals transmitted from UE 107 to base station 103). For example, as shown in FIG. 1, UE 107-2 may be associated with channels 109-1 and 107-2 (indicated in the figure by dashed lines) between two respected base stations 103. While not explicitly shown in this figure, other channels may be associated with UE 107-2 and one or more other base stations 103. In some embodiments, a given UE 107-base station 103 may be associated with multiple channels, such as one or more uplink channels and one or more downlink channels. In some embodiments, the channel(s) 109 between a given UE 107 and one or more base stations 103 may include a Physical Uplink Shared Channel ("PUSCH"), a Physical Uplink Control Channel ("PUCCH"), a Physical Downlink Shared Channel ("PDSCH"), a Physical Downlink Control Channel ("PDCCH"), and/or one or more other channels. In some embodiments, the channel(s) 109 between a given UE 107 and one or more base stations 103 may include different channels associated with different frequencies, frequency bands, and/or RATs. While example channels 109-1 and 109-2 are shown in FIG. 1 between UE 107-2 and two base stations 103, in practice other channels 109 may be present between other UEs 107 and other base stations 103.

Relatively low channel propagation metrics (e.g., a relatively low RSRQ value, RSRP value, etc.) for a given channel 109 may indicate that the propagation of RF signals between a respective base station 103 and UE 107 is relatively weak, which may be caused by a relatively large distance between base station 103 and UE 107, obstacles in a line of sight between base station 103 and UE 107 (e.g., buildings, topographical features, etc.), interference (e.g., colliding RF signals from other sources, such as other base stations 103, drones, aviation equipment, or other RF-emitting devices), beamforming or other configuration parameters of base station 103 (e.g., directionality and/or transmit power associated with one or more antennas of base station 103), or other phenomena.

For example, a particular measurement report from a given UE 107 may indicate that UE 107 detected RF signals from one or more base stations 103 (e.g., via one or more respective channels 109 between UE 107 and the one or more base stations 103) of a given sector 101. As an example, the measurement report from UE 107 may indicate a relatively low RSSI value, RSRP value, etc. associated with signals from base station 103. Such values may be "relatively" low in that such values may be below a threshold value, and/or may be lower than an expected or threshold value (e.g., which may be determined based on a historical analysis of propagation metrics associated with sector 101). Further, such analysis may be performed based on location, where a first threshold value may be used at a first location (e.g., relatively close to base station 103), while a second threshold value may be used at a second location (e.g., farther away from base station 103).

In some embodiments, and as further discussed below with respect to FIG. 3, ROS 105 may further receive and/or maintain attribute and/or characteristic information for one or more sectors 101. Briefly, such attribute and/or characteristic information may include configuration parameters (e.g., beamforming configuration parameters, RF transmission power parameters, Multiple-Input Multiple-Output ("MIMO") configuration parameters, or the like), physical network infrastructure parameters (e.g., antenna height, antenna location, etc.), locale features (e.g., building density, topographical information, or the like), and/or other types of information associated with respective sectors 101 and/or network infrastructure associated with respective sectors 101 (e.g., network infrastructure located within given sectors 101, and/or providing wireless service to given sectors 101).

In some embodiments, ROS 105 may communicate with base stations 103 of sectors 101 and/or UEs 107 located within such sectors 101 via an application programming interface ("API"), an X2 interface, and/or some other suitable communication pathway, in order to receive such information. For example, base stations 103 and/or UEs 107 communicatively coupled to respective base stations 103 may "push" such information to ROS 105 (e.g., via the API) on a periodic or intermittent basis, upon the occurrence of trigger events (e.g., the detection of a reference signal from one or more base stations 103 by a UE 107 located within a given sector 101, one or more Quality of Service ("QoS") metrics exceeding a threshold value, a connection or disconnection of one or more UEs 107 to one or more base stations 103, and/or other events), and/or on some other basis. In some embodiments, ROS 105 may "pull" (e.g., request or otherwise obtain) such information from the UEs, base stations 103, and/or other device or system that receives, collects, maintains, and/or provides such information. For example, ROS 105 may be communicatively coupled to a Service Capability Exposure Function ("SCEF") of a core network associated with base stations 103, a Network Exposure Function ("NEF"), and/or other suitable device, system, function, etc.

As further shown, ROS 105 may determine (at 104) one or more sector models associated with respective sectors 101, as well as channel propagation models associated with respective sectors 101, based on the received channel propagation metrics. For example, as discussed below, ROS 105 may use AI/ML techniques or other suitable techniques to identify one or more sector models that includes attributes that are similar to the attributes associated with respective sectors 101. For example, when determining whether attributes of a given sector model are "similar" to attributes of a given sector 101, ROS 105 may generate one or more scores, classifiers, or the like, and/or may perform a suitable similarity analysis to determine a measure of similarity between attributes of a set of sector models and attributes of a given sector 101. In some embodiments, ROS 105 may select a particular sector model if the measure of similarity exceeds a threshold measure of similarity. Additionally, or alternatively, ROS 105 may select a particular quantity of highest-scoring sector models (e.g., the highest scoring sector mode, the top three scoring sector models, etc.). In some embodiments, ROS 105 may select a particular quantity of highest-scoring sector models, so long as the scores associated with such sector models exceeds a threshold score (e.g., the top three scoring sector models so long as the top three scoring sector models exceed the threshold score, the top two scoring sector models if the third highest-scoring sector model is below the threshold score, etc.).

As further discussed in more detail below, ROS 105 may further determine (at 104) one or more channel propagation models for one or more sectors 101 based on the sector models identified with respect to respective sectors 101, as well as the channel propagation metrics received (at 102) with respect to the respective sectors 101. Channel propagation models may indicate, for example, channel propagation metrics as a function of location within a given sector 101. For example, determined channel propagation model for a given sector 101 may indicate that propagation metrics are relatively higher in regions that are closer to a particular base station 103 located in the given sector 101, and that propagation metrics are relatively lower in regions that are farther away from the particular base station 103 located in sector 101. As another example, a given channel propagation model may indicate that propagation metrics are relatively lower in a region where an obstacle such as a building is located in a line of sight between the region and a base station 103 located in sector 101. Examples of channel propagation models are discussed in greater detail below with respect to FIGS. 4-6.

As additionally discussed below, ROS 105 may determine (at 104) one or more remedial and/or performance-enhancing actions to perform with respect to a given sector 101. For example, ROS 105 may determine actions such as modifying RF parameters (e.g., RF transmission power, beamforming parameters, MIMO parameters, or the like) to improve channel propagation metrics in a given region, such as a region which has, or is expected to have (e.g., based on one or more predictive usage or load models) high demand for wireless service. As another example, the actions may include the modification of one or more handover thresholds, which may be used by base station 103 and/or UEs 107 to determine when to perform or request a handover from one base station 103 to another. In some embodiments, the actions may include any suitable action to enhance the operation of the RAN and/or of UEs 107 receiving wireless service from the RAN.

As noted above, the selection (at 104) of actions based not only on channel propagation metrics (e.g., based on channel propagation models), but also based on the characteristics and/or attributes of a sector 101 (e.g., based on sector models), may allow for channel propagation-enhancing solutions that are better tailored to sectors with particular configurations, attributes, or the like. Such solutions may be more likely to succeed and/or have more impact (e.g., increase of channel propagation metrics for channels 109 between base stations 103 and respective UEs 107) than actions selected solely based on the detection of particular channel propagation metrics in a given sector 101.

In some embodiments, ROS 105 may receive (at 102) channel propagation metrics over time, and may select (at 104) different sets of actions (e.g., for particular sectors 101 and/or varying sets of sectors 101) based on different channel propagation metrics received at different times and/or time periods. As one example, a particular sector 101 may exhibit a first set of channel propagation metrics at times corresponding to a morning or afternoon weekday commute, and may exhibit a second set of channel propagation metrics at times corresponding to an evening or weekend. In this example, ROS 105 may determine (at 104) a first channel propagation model (or set of channel propagation models) and associated actions during morning or afternoon hours on weekdays, and may determine a second channel propagation model (or set of channel propagation models) and one or more associated actions during evening hours and/or weekends.

ROS 105 may further output (at 106) information indicating the identified actions to respective sectors 101. ROS 105 may, for example, indicate the determined actions to respective base stations 103 associated with sectors 101, to a management device or system associated with one or more sectors 101, and/or some other device or system. For the sake of brevity, the performance of a given action by a network infrastructure element located in or serving sector 101 (e.g., base station 103 or some other suitable device or system) will be referred to herein as sector 101 "performing" the action.

Respective sectors 101 may perform (at 108) the indicated actions, and ROS 105 may continue to receive (at 102) up-to-date channel propagation metrics associated with sectors 101. ROS 105 may, based on continuing to receive the up-to-date channel propagation metrics, modify the determination of channel propagation models associated with a particular sector 101. In some embodiments, ROS 105 may select a new set of actions for sector 101 based on the up-to-date channel propagation metrics. In some embodiments, ROS 105 may modify one or more sector models, channel propagation models, and/or other information based on whether the performed (at 108) actions improved channel propagation metrics, and/or based on how much effect the actions had on such metrics.

While described in the context of being performed by ROS 105, in some embodiments, one or more devices or systems associated with sectors 101 may perform one or more of the operations described above in lieu of, or in addition to, ROS 105. For example, in some embodiments, one or more devices or systems of sector 101 may identify a particular action based on a given sector model and/or channel propagation model, and/or based on continuing to monitor channel propagation metrics associated with sector 101 after performing (at 108) a particular action or set of actions.

Figure 2:
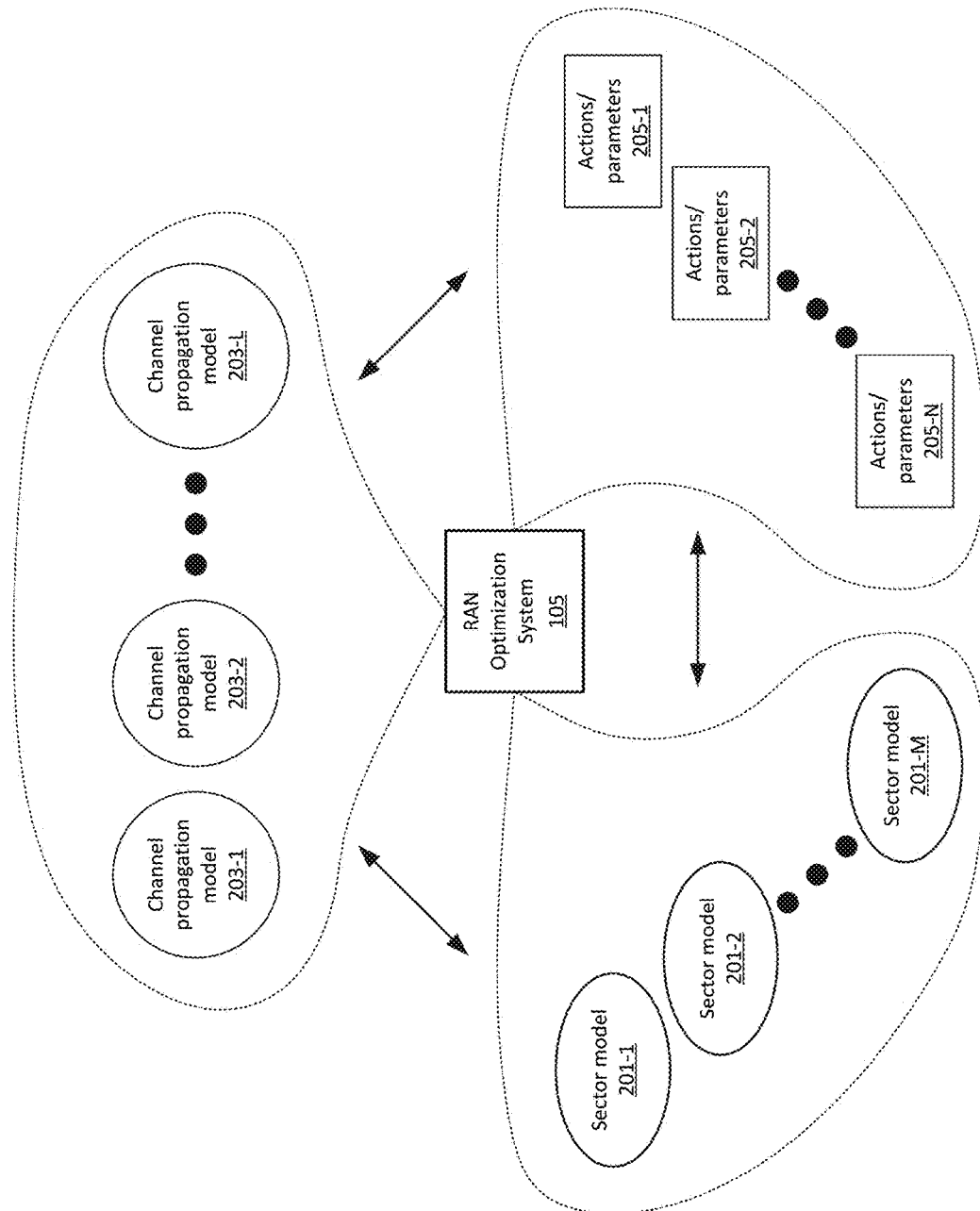
FIG. 2 illustrates example channel propagation models, sector models, and/or actions/parameters that may be generated, received, maintained, provided, etc. by a ROS of some embodiments.

FIG. 2 illustrates example interference models, sector models, and/or actions/parameters that may be generated, received, maintained, provided, etc. by ROS 105. For example, ROS 105 may be associated with a set of sector models 201, such as example sector models 201-1, 201-2, and 201-M. Further, ROS 105 may be associated with a set of channel propagation models 203, such as example channel propagation models 203-1, 203-2, and 203-L. Additionally, ROS 105 may be associated with a set of actions/parameters 205, such as example actions/parameters 205-1, 205-2, and 205-N.

ROS 105 may generate and/or modify sector models 201, channel propagation models 203, and/or actions/parameters 205 based on AI/ML techniques or other suitable techniques. For example, ROS 105 may generate, modify, refine, etc. sector models 201, channel propagation models 203, and/or actions/parameters 205 based on an evaluation of real-world data from sectors 101 and/or simulations of channel propagation metrics in a simulation and/or test environment. ROS 105 may further determine or identify correlations between respective sector models 201, channel propagation models 203, and/or actions/parameters 205 using AI/ML techniques or other suitable techniques.

Figure 3:
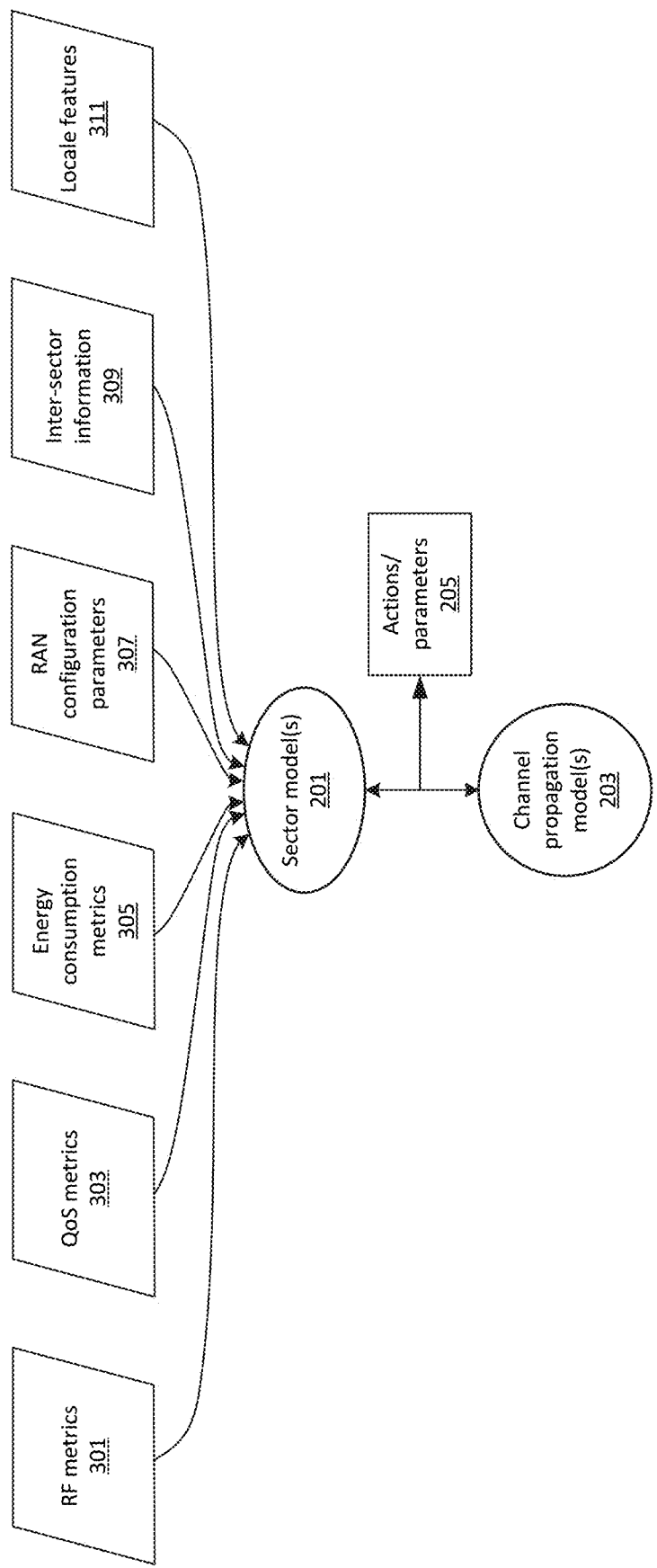
FIG. 3 illustrates example attributes associated with a particular sector model, and further illustrates an example associations between the sector model, channel propagation model, and actions and/or parameters, in accordance with some embodiments.

For example, as shown in FIG. 3, sector model 201 may include RF and/or interference metrics 301 (referred to simply as "RF metrics 301" for the sake of brevity), Quality of Service ("QoS") metrics 303, energy consumption metrics 305, RAN configuration parameters 307, inter-sector information 309, locale features 311, and/or one or more other types of information.

RF metrics 301 associated with a given sector 101 may include metrics related to the propagation of RF signals from network infrastructure within sector 101 (or providing service to sector 101). For example, RF metrics 301 may include RSRP values, RSRQ values, RSSI values, SINR values, CQI values, or other indicators of RF signal quality or strength. In some embodiments, RF metrics 301 may be determined by UEs 107 or other RF signal-receiving devices located within or near (e.g., within a threshold distance of) sector 101.

In some embodiments, RF metrics 301 may be computed based on values provided by UEs 107. For example, ROS 105, a given base station 103, and/or some other device or system may receive a RSRP value from a particular UE 107 (e.g., indicating a RSRP value associated with a particular channel 109 between UE 107 and a particular base station 103), and the RSRP value may be compared to a transmit power associated with the particular channel 109 (e.g., a power at which base station 103 transmitted a reference signal for which UE 107 measured or determined the RSRP value). The difference between the RSRP value and the transmit power may indicate a measure of path loss associated with the particular channel 109. Further, path loss (and/or other channel propagation metrics) may be determined as a function of geographical location, such that the RF metrics 301 associated with sector 101 may be indicated or determined based on a geographical location at which a particular UE 107 (or other suitable device or system) that measured or determined a given set of RF metrics (e.g., channel propagation metrics) was located when measuring such metrics.

As noted above, ROS 105 may receive the measurement reports and/or other suitable RF metrics 301 from UEs 107 (e.g., via an API or other suitable communication pathway), and/or from base stations 103 (e.g., via an X2 interface or other suitable communication pathway, where base stations 103 may receive measurement reports from UEs via Radio Resource Control ("RRC") messaging or some other suitable communication pathway). In some embodiments, ROS 105 may receive RF metrics 301 from some other device or system.

QoS metrics 303 may reflect QoS metrics associated with a particular sector 101 over a particular period of time. For example, QoS metrics 303 may include metrics relating to latency, bandwidth, jitter, packet loss, and/or other metrics related to network layer performance, application layer performance, or other "higher" layer performance (e.g., performance at a layer above a physical layer and/or a data link layer). QoS metrics 303 associated with a given sector 101 may be collected from and/or reported by UEs 107 receiving wireless service within sector 101 and/or from a base station 103 located within sector 101, and/or may be received from base station 103 located in or providing wireless service to sector 101.

Energy consumption metrics 305 may indicate an amount of energy consumed at the particular sector 101 over the particular period of time. For example, energy consumption metrics 305 may indicate an amount of electrical power (e.g., kilowatt-hours or some other measure of consumed power) consumed by network infrastructure elements (e.g., base stations 103, data centers, routers, hubs, and/or other equipment) within or serving sector 101 over a given period of time.

RAN configuration parameters 307 may include parameters such as an indication of quantity and/or position (e.g., geographical position) of physical infrastructure hardware (e.g., antennas, radios, data centers, or the like) associated with one or more RANs in sector 101. In some embodiments, RAN configuration parameters 307 may indicate particular RATs implemented in sector 101 (e.g., a LTE RAT, a 5G RAT, etc.), beam configurations implemented in sector 101 (e.g., beam quantity, beam azimuth angles, beam width, beam transmission power, etc.), MIMO configuration information, and/or other suitable information. In some embodiments, some or all RAN configuration parameters 307 may be determined or maintained on a granular basis, such as a per-UE basis or some other basis. For example, in some embodiments, RAN configuration parameters 307 may include a transmission power associated with a particular channel 109, a transmission power of RF signals sent from a particular base station 103 to a particular UE 107, a transmission power of RF signals sent by base station 103 via one or more Physical Resource Blocks ("PRBs"), or on some other basis.

Inter-sector information 309 may include information associated with sectors adjacent to or proximate to a given sector 101. For example, inter-sector information 309 may include RF metrics, RAN parameters, QoS metrics, and/or energy consumption metrics, associated with sectors adjacent to or within a threshold distance of sector 101. In some embodiments, inter-sector information 309 may include mobility information, which may be associated with mobility of UEs between sector 101 and neighboring sectors. For example, inter-sector information 309 may indicate that UEs that are located in sector 101 are likely to be stationary within sector 101 for a first duration of time (e.g., approximately one hour), and then that such UEs travel to a particular neighboring sector. As another example, inter-sector information 309 may indicate that UEs that are located in the neighboring sector are relatively likely to enter the particular sector 101.

Locale features 311 may include information indicating attributes and/or features of the geographical area. For example, locale features 311 may include information relating to building layout and/or density, topographical features (e.g., mountains, valleys, forests, streams, etc.), weather-related information, air quality-related information (e.g., smog density, particulate density, fog density, etc.), and/or other factors that may affect RF metrics, energy consumption metrics, QoS metrics, or other metrics. Locale features 311 may include geographical coordinates (e.g., latitude and longitude coordinates, Global Positioning System ("GPS") coordinates, or the like) or other suitable location information, to indicate the geographical locations of respective features.

As described below, a given sector 101 may be associated with one or more sector models 201 based on a comparison of the above-described factors, and/or one or more other factors, of sector 101 to such factors associated with a set of candidate sector models 201. Briefly, for example, ROS 105 may determine that a particular sector 101, that exhibits a particular set of RF metrics 301, a particular set of QoS metrics 303, a particular set of energy consumption metrics 305, and a first set of locale features 311 (e.g., urban features such as high-rise buildings) is associated with a first sector model 201, while another sector 101, that exhibits a similar set of RF metrics 301, a similar set of QoS metrics 303, and a similar set of energy consumption metrics 305, but a different second set of locale features 311 (e.g., rural features such as relatively flat areas with relatively low building density) is associated with a different second sector model 201.

Channel propagation models 203 may indicate, predict, include, and/or be generated based on channel propagation metrics as a function of geographical location. For example, a particular channel propagation model 203, associated with a particular sector 101, may indicate channel propagation metrics as a function of a distance from the center of sector 101, as a set of latitude and longitude coordinates (e.g., where such coordinates fall within coordinates defining a boundary of sector 101), as an index or identifier of discretely defined regions of sector 101, or in some other suitable manner.

Figure 4:
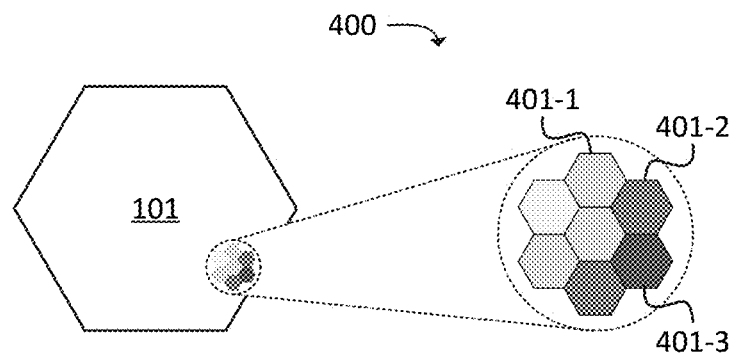
FIGS. 4-6 conceptually illustrate example channel propagation information that may be included in, or reflected by, channel propagation models of some embodiments.
Figure 5:
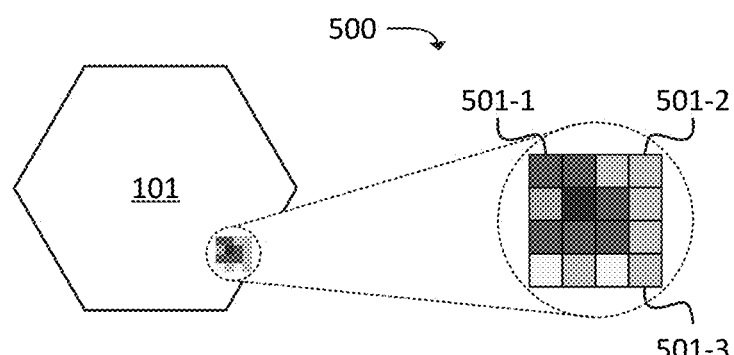
Figure 6:
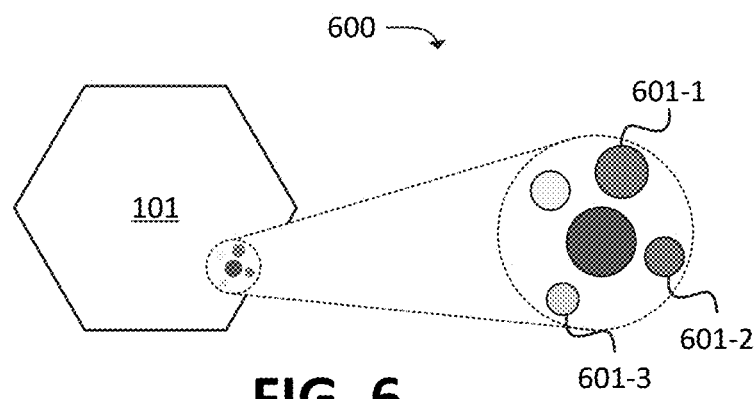

FIGS. 4-6 conceptually illustrate example channel propagation information that may be included in, or reflected by, channel propagation models 203 of some embodiments. For instance, as shown in FIG. 4, example channel propagation model 400 may include channel propagation metrics associated with a particular sector 101 on the basis of sub-sectors 401, where a shape of sub-sectors 401 is defined as a hexagon, and/or having the same shape as sector 101 itself. While FIG. 4 shows an expanded view of some sub-sectors 401 of sector 101, in practice, additional sub-sectors 401 may be present in sector 101.

In the examples herein, darker shading (e.g., as present in sub-sector 401-3) may represent relatively higher channel propagation metrics (e.g., higher signal strength, higher channel quality, lower interference, etc.), while lighter shading (e.g., as present in sub-sector 401-1) may represent relatively lower channel propagation metrics (e.g., lower signal strength, lower channel quality, higher interference, etc.). The shading of sub-sector 401-2 may indicate channel propagation metrics that are relatively higher than those associated with sub-sector 401-1, and relatively lower than those associated with sub-sector 401-3.

In some embodiments, the shading in the figures may represent average channel propagation metrics (e.g., averages of raw values) over time, maximum channel propagation metrics in a given time period, minimum channel propagation metrics in a given time period, and/or some other computed value based on channel propagation metrics received or determined over a given time period. In some embodiments, the shading may represent a score generated based on one or more channel propagation metrics. For example, ROS 105 may generate a channel propagation score based on RSRQ values, RSRP values, RSSI values, SINR values, and/or one or more other suitable channel propagation metrics as a function of geographical location (e.g., in this example, on a per-sub-sector 401 basis).

FIG. 5 provides another potential representation of channel propagation model 500, in accordance with some embodiments. In this example, sub-sectors 501 (e.g., sub-sector 501-1, 501-2, and 501-3) are geographical regions within sector 101 having a square shape (e.g., a grid pattern), and/or having a different shape than sector 101 itself. As similarly discussed above with respect to FIG. 4, the shading associated with various sub-sectors 501 may indicate channel propagation metrics associated with respective sub-sectors 501 (e.g., over a particular time period).

FIG. 6 provides another example representation of channel propagation model 600, in accordance with some embodiments. In this example, sub-sectors 601 (e.g., sub-sector 601-1, 601-2, and 601-3) are geographical regions within sector 101 having no particular pattern or relationship with each other. In this example, sub-sectors 601 are circles of varying sizes. In practice, sub-sectors 601 may be defined differently. In some embodiments, sub-sectors 601 may relate to regions defined or determined automatically (e.g., using one or more AI/ML techniques or other suitable techniques), such as regions in which relatively heavy UE traffic has been detected, regions relating to physical structures (e.g., office buildings, universities, etc.), regions within a particular proximity to a particular base station 103, etc. As similarly discussed above with respect to FIGS. 4 and 5, the shading associated with various sub-sectors 601 may indicate channel propagation metrics associated with respective sub-sectors 601 (e.g., over a particular time period).

The example channel propagation metrics reflected in FIGS. 4-6 may each represent channel propagation metrics received or determined over particular time period (e.g., one day, one week, one month, etc.). Thus, a particular channel propagation model 203 may include multiple sets of channel propagation metrics (e.g., multiple instances of the representations shown in FIGS. 4-6) for multiple time periods. That is, channel propagation model 203 may include a temporal element to reflect cyclical, periodic, intermittent, and/or otherwise repeating patterns or trends in channel propagation metrics within sector 101. Additionally, or alternatively, sector 101 may be associated with multiple different channel propagation models 203, where each of the channel propagation models 203 associated with sector 101 is further associated with a temporal condition, parameter, etc.

While the examples of FIGS. 4-6 include representations of channel propagation metrics as a function of geographical location in two-dimensional space, in some embodiments, channel propagation models 203 may include channel propagation metrics as a function of geographical location in three-dimensional space. For example, the same two-dimensional sub-sector, region, etc. of a given sector 101 may be associated with two different sets of channel propagation metrics at different heights, altitudes, floors of a building, etc.

Further, while the examples of FIGS. 4-6 use shading to represent channel propagation metrics, in practice, channel propagation metrics may be represented in some other way. For example, a three-dimensional plot may represent channel propagation metrics as a function of geographical location, where two axes of the three-dimensional plot represent latitude and longitude coordinates (or other descriptor of geographical location) and a third axis represents channel propagation metrics. For example, a higher value along the third axis may represent relatively higher channel propagation metrics at a given geographical location, and a lower value along the third axis may represent relatively lower channel propagation metrics at a given geographical location.

Figure 7:
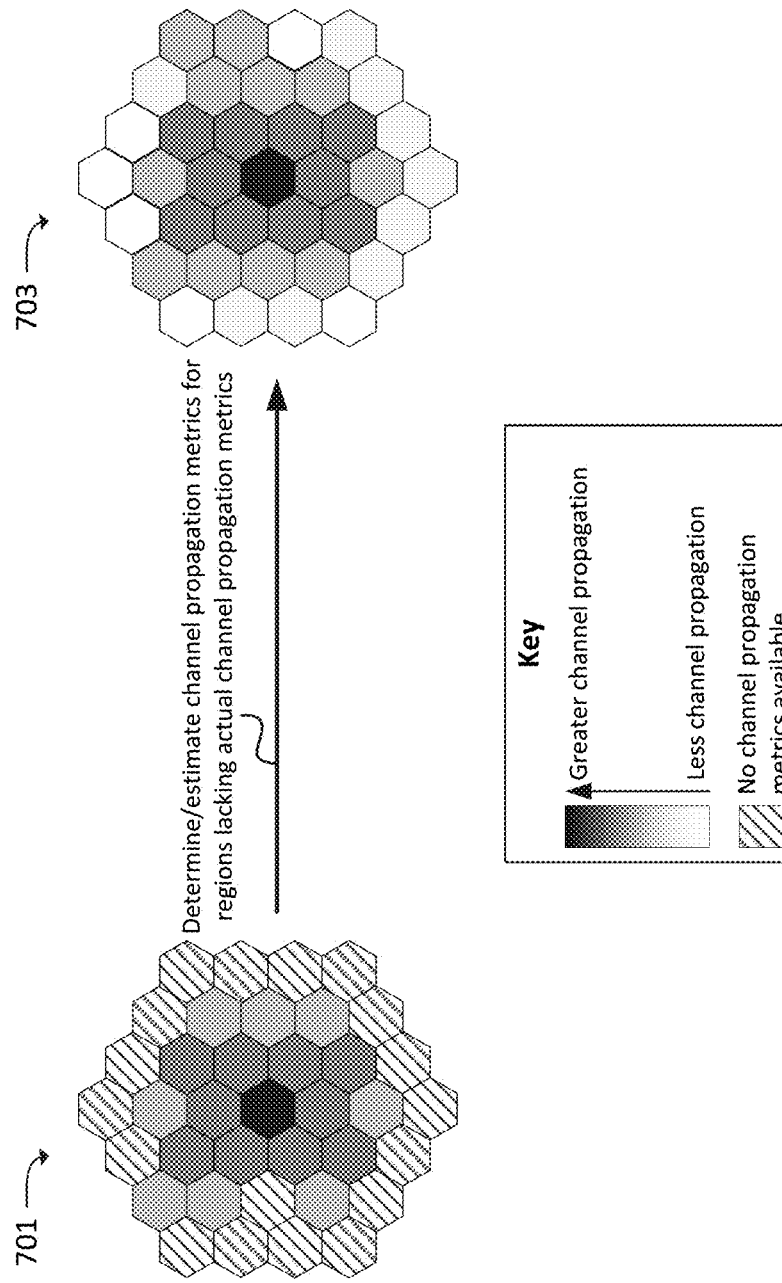
FIG. 7 illustrates an example of extended channel propagation information for geographical regions for which measured channel propagation information may be unavailable or insufficient.

As noted above, channel propagation models 203 (e.g., the representations shown in FIGS. 4-6) may be generated based on channel propagation metrics received from UEs 107. However, situations may arise where certain portions of a particular sector 101 do not have any associated channel propagation metrics, or a relatively sparse amount of channel propagation metrics (e.g., fewer measured or derived values indicating channel propagation metrics than a threshold amount of values, fewer measured or derived values indicating channel propagation metrics than other portions of sector 101, etc.). For example, as shown in FIG. 7, channel propagation model 701 for a given sector 101 may include channel propagation metrics for some sub-sectors of sector 101 (e.g., where such channel propagation metrics are determined in a manner similar to that described above). Channel propagation model 701 may further indicate a lack of channel propagation metrics for some of the sub-sectors. For example, such lack of channel propagation metrics for these sub-sectors may be based on UEs 107 not being physically located in these sub-sectors, UEs 107 being handed over to different sectors 101 (e.g., receiving wireless service from base stations 103 of other sectors 101), and/or for other reasons.

In accordance with some embodiments, ROS 105 may generate channel propagation model 703 based on channel propagation model 701. Channel propagation model 703 may include estimated or predicted channel propagation metrics for the sub-sectors for which channel propagation metrics have not been determined. In some embodiments, ROS 105 may interpolate, extrapolate, and/or otherwise compute channel propagation metrics for these sub-sectors based on channel propagation metrics for sub-sectors for which channel propagation metrics have been determined. For example, ROS 105 may perform a regression analysis, smoothing, curve fitting, and/or other suitable analysis to generate channel propagation model 703 based on channel propagation model 701. In some embodiments, ROS 105 may use one or more path loss models, AI/ML models, and/or other suitable types of models to compute, determine, estimate, etc. channel propagation metrics for the sub-sectors for which sufficient channel propagation metrics have not been received.

Figure 8:
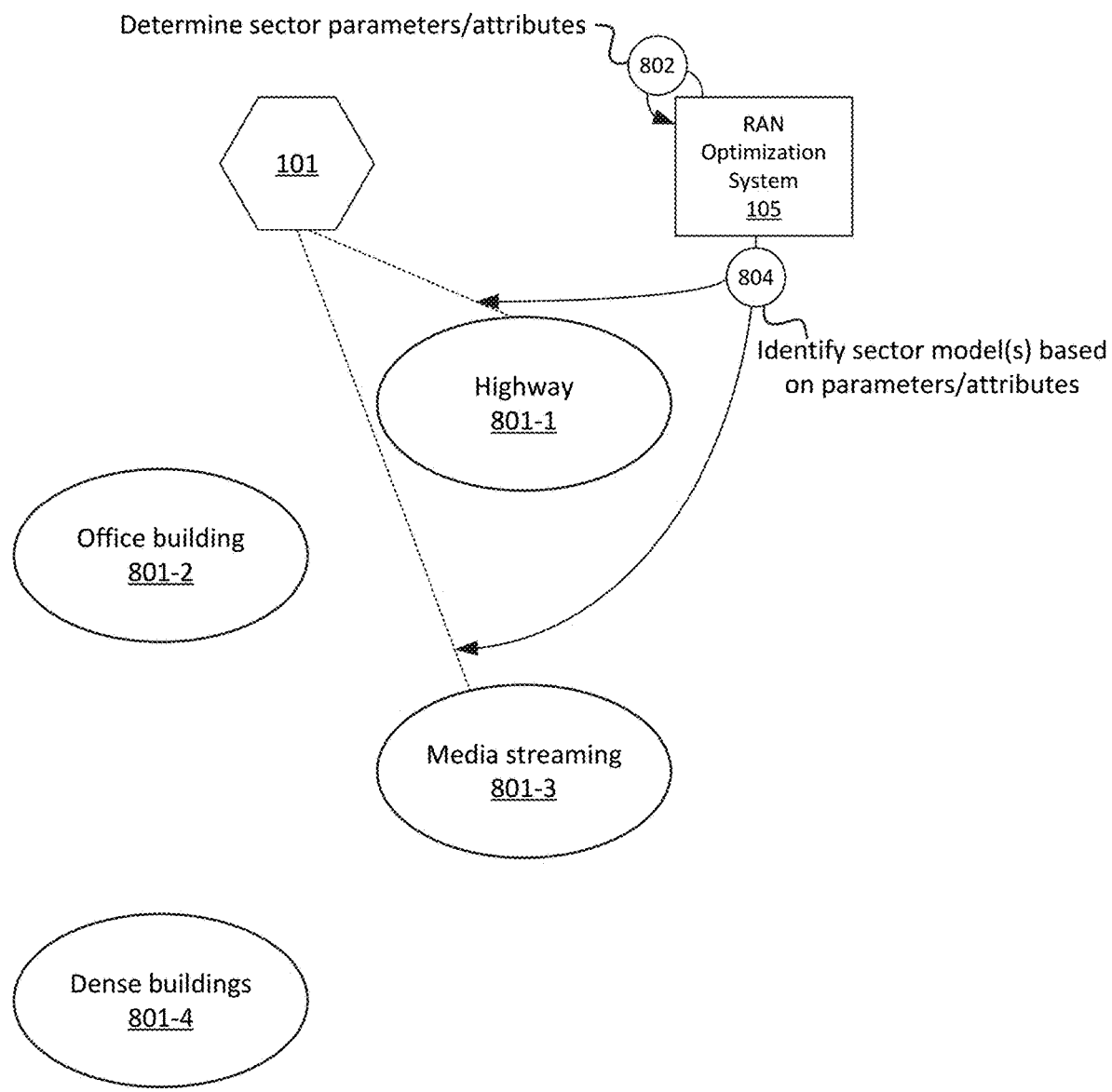
FIG. 8 illustrates an example determination of one or more sector models associated with a given sector associated with a RAN of a wireless network, in accordance with some embodiments.

FIG. 8 illustrates an example determination of one or more sector models 201 for a particular sector 101. As shown, ROS 105 may determine (at 802) parameters and/or attributes of sector 101. As discussed above, such parameters and/or attributes may include RF metrics 301, QoS metrics 303, energy consumption metrics 305, RAN configuration parameters 307, inter-sector information 309, locale features 311, and/or other suitable parameters, attributes, metrics, or the like. ROS 105 may further identify (at 804) one or more sector models 201 based on the determined parameters and/or attributes of sector 101.

In this example, ROS 105 may determine that sector 101 is associated with a "highway" sector model 801-1 and a "media streaming" sector model 801-3. As further shown, ROS 105 may not determine that sector 101 is associated with an example "office building" sector model 801-2, or an example "dense buildings" sector model 801-4. For example, ROS 105 may determine, based on a suitable similarity analysis of the parameters and/or attributes of sector 101, that sector models 801-2 and 801-4 do not match (e.g., correspond with a measure of similarity above a threshold measure of similarity) sector 101, and/or that sector models 801-1 and 801-3 match (e.g., have a higher measure of similarity with) the parameters and/or attributes of sector 101 more closely. As discussed above, operations 802 and 804 may be performed on an ongoing basis, such that the selection of particular sector models 801 may change based on updated parameters and/or attributes received by ROS 105 over time.

Figure 9:
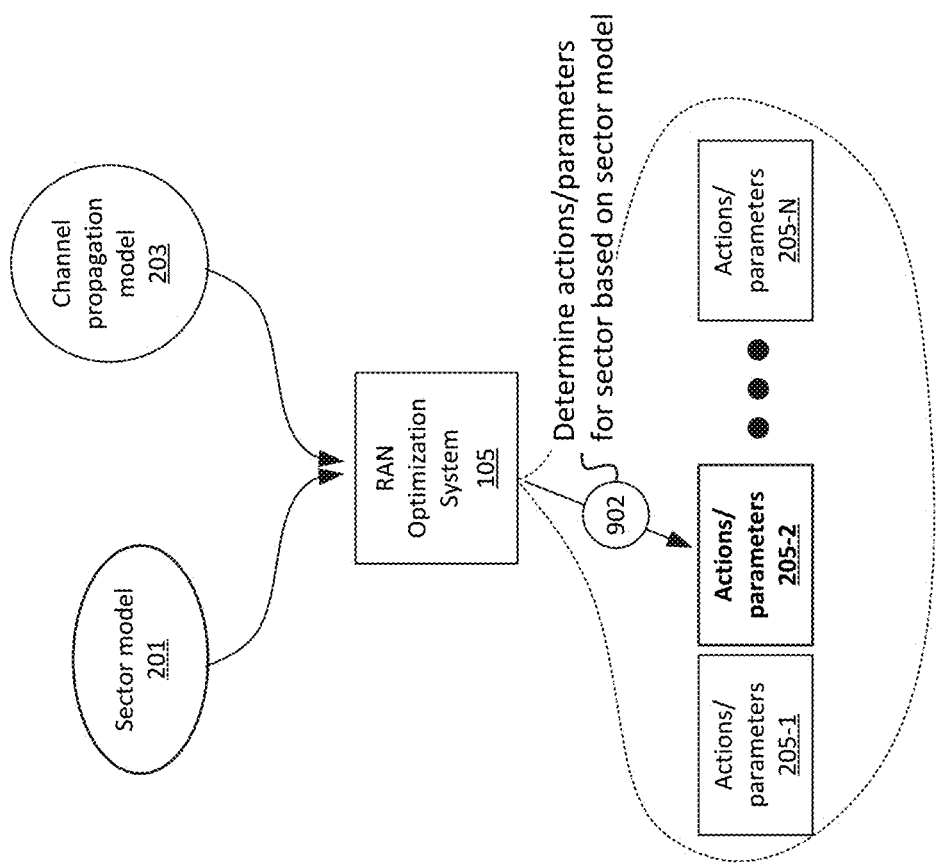
FIG. 9 illustrates an example determination of a particular set of actions to perform with respect to a given sector of a RAN based on a sector model and a channel propagation model associated with the sector, in accordance with some embodiments.

As shown in FIG. 9, ROS 105 may determine (at 902) a set of actions 205 for a given sector 101 based on one or more determined sector models 201 for sector 101, as well as one or more determined channel propagation models 203 for sector 101. ROS 105 may use one or more AI/ML techniques to determine an appropriate channel propagation model 203 (e.g., channel propagation model 203-2, in this example) to represent the channel propagation metrics associated with sector 101 (e.g., as a function of geographical location within sector 101), where the selection is further based on attributes of sector 101 (e.g., sector model 201).

As noted above, ROS 105 may generate, maintain, refine, etc. (e.g., using one or more AI/ML techniques or other suitable techniques) one or more associations between respective channel propagation models 203 and one or more sets of actions/parameters 205. In some embodiments, such associations may be multi-factor associations. For example, a first set of actions/parameters 205 may be associated with a particular channel propagation model 203 and a first sector model 201, while a second set of actions/parameters 205 may be associated with the same channel propagation model 203 and a second sector model 201. As another example, a first set of actions/parameters 205 may be associated with a first channel propagation model 203 and a particular sector model 201, while a second set of actions/parameters 205 may be associated with a second channel propagation model 203 and the same sector model 201.

For example, each sector model 201-channel propagation model 203 pair may be associated with one or more sets of actions/parameters 205, as each particular set of actions/parameters 205 may have been determined (e.g., based on real-world results and/or simulated results) as increasing the performance (e.g., increasing channel propagation metrics) of one or more sectors 101 (and/or of particular sub-sectors of sectors 101) that match a particular sector 101 that is associated with a particular sector model 201 and channel propagation model 203. As noted above, actions/parameters 205 may include modifying RF signal transmit power of one or more antennas and/or base stations 103 (e.g., on a per-UE basis and/or on some other basis), modifying beamforming parameters (e.g., modifying a coverage area of one or more base stations 103), and/or other suitable actions to enhance the propagation of RF signals to appropriate locations (e.g., sub-sectors or other locations at which UEs are located and/or are expected or predicted to be located).

In some embodiments, ROS 105 may also determine affinity scores and/or other correlations between sector models 201, channel propagation models 203, and respective sets of actions/parameters 205. Such affinity scores may generally indicate how effective a given set of actions/parameters 205 are for enhancing channel propagation metrics in particular sector 101 (e.g., at particular sub-sectors), given sector model 201 and channel propagation model 203 associated with sector 101. When selecting a particular channel propagation model 203 for sector 101 based on received or determined channel propagation metrics, ROS 105 may select such channel propagation model 203 based on affinities, scores, correlations, or the like between sector model 201 and channel propagation model 203.

Similarly, when determining a particular set of actions/parameters 205 for a particular sector 101, ROS 105 may select the particular set of actions/parameters 205 from candidate sets of actions/parameters 205 based on an affinity, score, correlation, etc. between sets of actions/parameters 205 and sector model 201 and/or channel propagation model 203.

Figure 10:
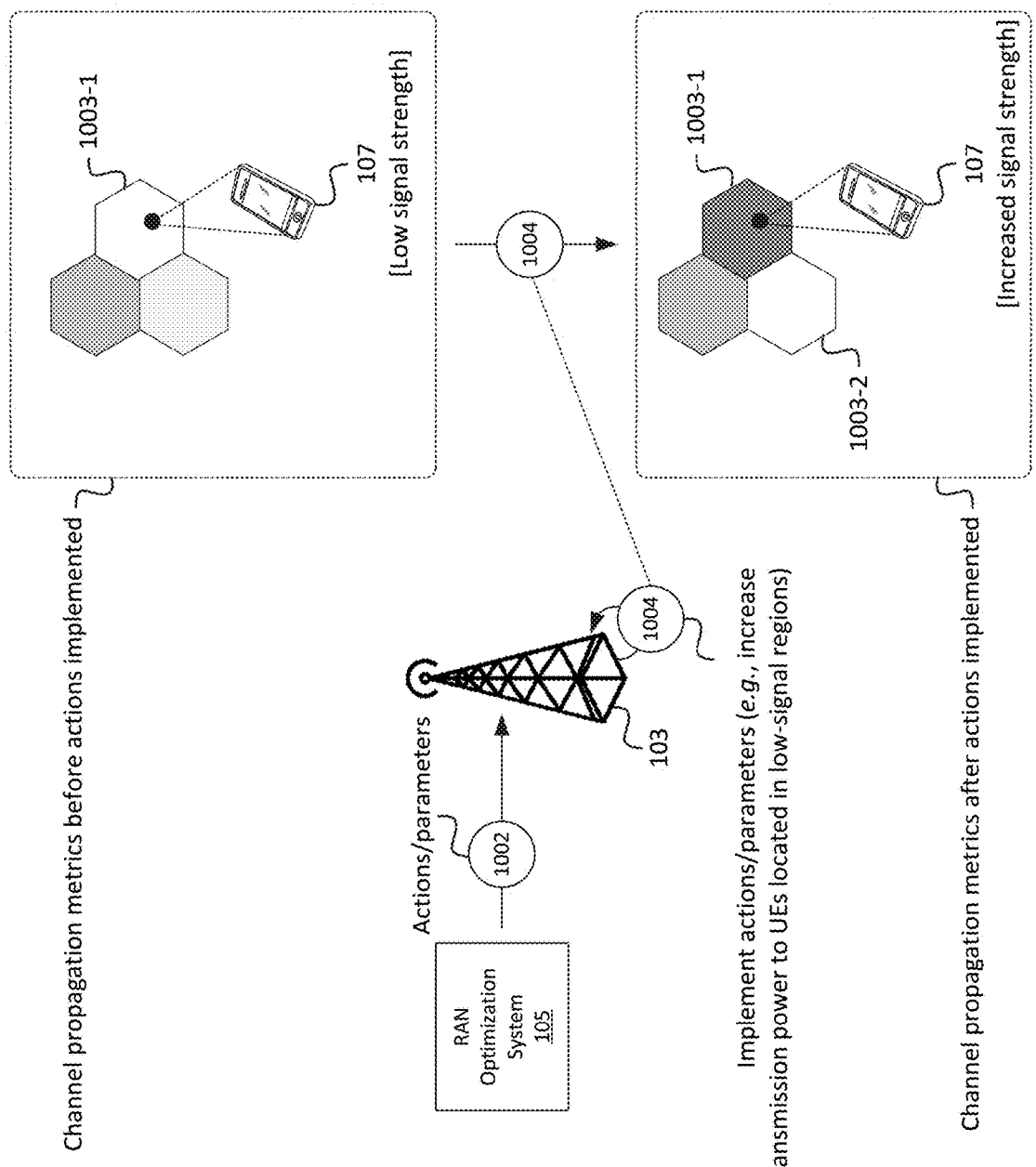
FIG. 10 illustrates an example implementation of one or more actions determined based on a sector model and a channel propagation model associated with a sector of a RAN, in accordance with some embodiments.

FIG. 10 illustrates an example implementation of a particular set of actions 205 by a particular base station 103. For example, base station 103 may receive (at 1002) a set of actions 205 from ROS 105. For example, ROS 105 may have determined actions 205 based on one or more sector models 201 associated with a sector 101 in which base station 103 is located, channel propagation metrics received from UEs 107 located in sector 101 and/or from base station 103, and/or one or more other factors. Additionally, or alternatively, base station 103 may determine a particular set of actions 205 to perform. For example, ROS 105 may provide one or more sector models 201 associated with sector 101 to base station 103 (and/or to some other device or system that communicates with base station 103, such as an orchestration platform), and base station 103 may determine actions 205 based on the received sector models 201.

In this example, assume that UE 107 is located in sub-sector 1003-1, which may be a sub-sector of sector 101 in which base station 103 is located (and/or in which wireless service may be received from base station 103). Prior to the implementing (at 1004) of actions 205, sub-sector 1003-1 may be a region in which relatively low channel propagation metrics (e.g., depicted in the figure as "low signal strength") are associated. In some embodiments, the relatively low channel propagation metrics may be determined or indicated based on a particular channel propagation model 203 that has been identified with respect to base station 103 and/or sector 101 associated with base station 103. That is, the "low signal strength" may be based on predicted or estimated values based on channel propagation model 203 in addition to, or in lieu of, real-world measured metrics.

Further, in this example, assume that base station 103, ROS 105, and/or some other device or system determines, estimated, predicts, etc. (e.g., based on one or more AI/ML, models, predictive models, threshold-based criteria, sector model 201 associated with sector 101, and/or other suitable techniques) that channel propagation metrics associated with sub-sector 1003-1 are below a threshold, and/or that such channel propagation metrics should be increased. For example, it may be determined, estimated, predicted, etc. that demand for wireless service within sub-sector 1003-1 may increase and/or may be relatively high. For example, base station 103 may determine that sub-sector 1003-1 includes an office building in which a relatively large quantity of UEs 107 are located during particular hours of the day and/or days of the week. Accordingly, base station 103 may determine that channel propagation metrics associated with sub-sector 1003-1 should be increased to meet the estimated, predicted, etc. demand (e.g., to enhance the user experience of UEs 107 located within sub-sector 1003-1).

Accordingly, base station 103 may implement (at 1004) actions 205 to improve channel propagation metrics at sub-sector 1003-1. For example, as discussed above, base station 103 may allocate additional power to RF transmissions directed toward sub-sector 1003-1, may modify a beamforming configuration (e.g., tilt angle and/or azimuth angle) to point one or more antennas toward sub-sector 1003-1, allocate additional power to RF transmissions directed toward particular UEs 107 located within sub-sector 1003-1 (e.g., on a per-PRB basis and/or some other basis), and/or may perform other suitable actions.

In some embodiments, performing (at 1004) actions 205 to increase channel propagation metrics associated with sub-sector 1003-1 may affect channel propagation metrics of one or more other sub-sectors. In this example, the actions taken to increase channel propagation metrics associated with sub-sector 1003-1 may decrease channel propagation metrics associated with sub-sector 1003-2. For example, actions 205 may include pointing one or more antennas, which were previously pointed towards sub-sector 1003-2, toward sub-sector 1003-1. In some embodiments, base station 103, ROS 105, and/or some other device or system may determine that demand for wireless service is greater at sub-sector 1003-1 than at sub-sector 1003-2, and/or that channel propagation metrics associated with sub-sector 1003-1 should be prioritized over channel propagation metrics associated with sub-sector 1003-2 based on one or more other factors.

While one example of actions 205 is provided in FIG. 10, as noted above, actions 205 may include any suitable actions to modify (e.g., increase) channel propagation metrics associated with a particular sector 101 or sub-sectors thereof. In some embodiments, actions 205 may include modifying handover thresholds in a particular sector 101 or sub-sectors thereof. For example, base station 103 may initiate a handover of a given UE 107 when base station 103 determines that UE 107 is located in, or is heading towards, a sub-sector that is associated with relatively low channel propagation metrics (e.g., as indicated by channel propagation model 203).

Figure 11:
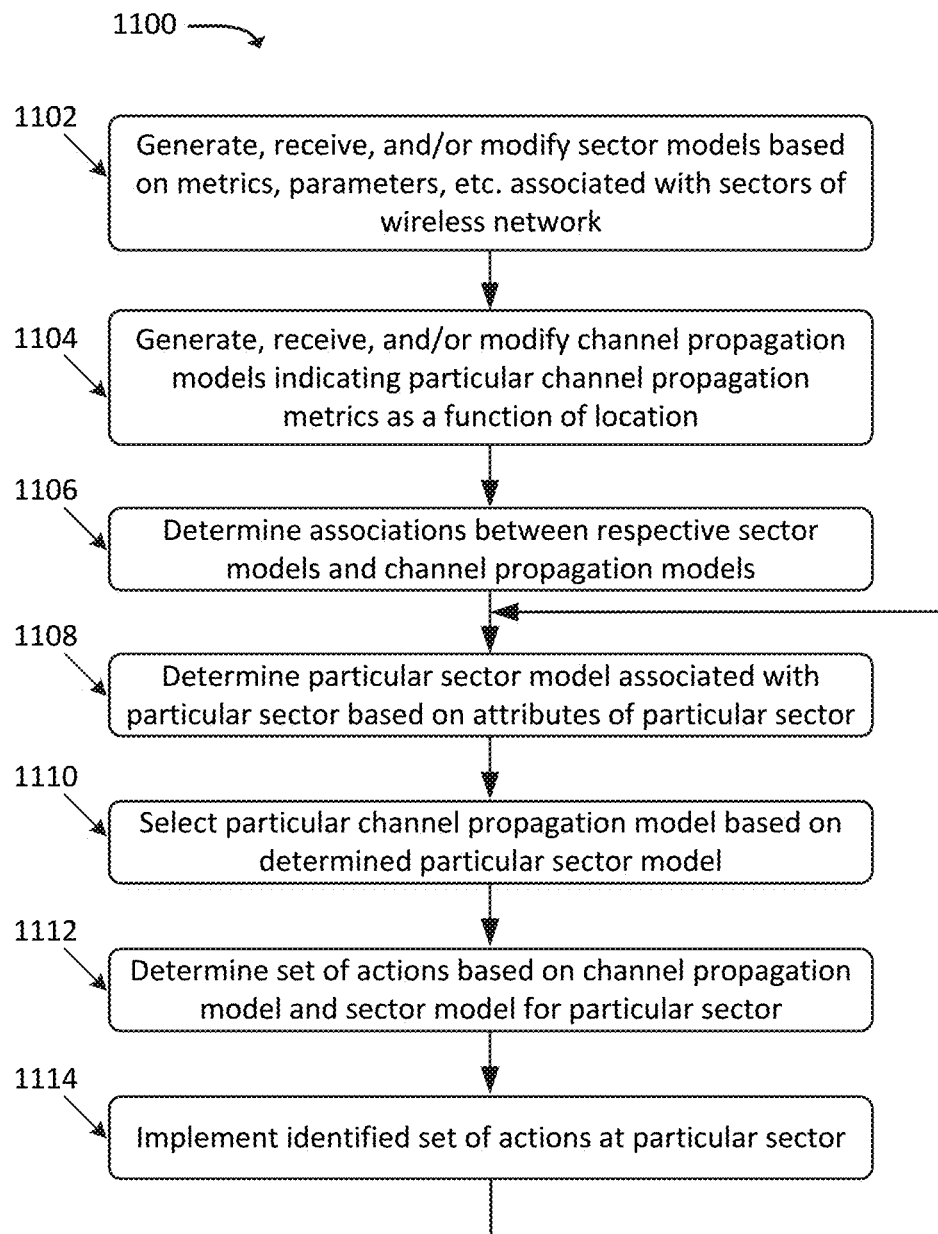
FIG. 11 illustrates an example process for modifying parameters of a RAN based on one or more channel propagation models identified with respect to one or more sectors of the RAN, in accordance with some embodiments.

FIG. 11 illustrates an example process 1100 for modifying parameters of a RAN based on one or more channel propagation models identified with respect to one or more sectors 101 of the RAN, in accordance with some embodiments. In some embodiments, some or all of process 1100 may be performed by ROS 105. In some embodiments, one or more other devices may perform some or all of process 1100 in concert with, and/or in lieu of, ROS 105, such as base station 103, a controller or orchestration platform associated with one or more network infrastructure elements associated with the RAN, and/or some other suitable device or system.

As shown, process 1100 may include generating, receiving, and/or modifying (at 1102) one or more sector models 201 based on metrics, parameters, etc. associated with one or more sectors 101 of a wireless network. For example, as discussed above, ROS 105 may use AI/ML techniques or other suitable techniques to generate and/or refine sector models 201. For example, ROS 105 may evaluate metrics based on real-word and/or simulated metrics and/or attributes of one or more sectors 101 in order to generate one or more clusters, classifications, or the like, which may be reflected by sector models 201. In one example, as referred to above, RF metrics 301 may be a factor based on which a particular sector model 201 is determined. In this manner, other sector attributes of a given sector 101 may be estimated, inferred, determined, etc. based on RF metrics 301 for the given sector 101. For example, ROS 105 may determine that if RF metrics 301 for a first sector 101 are the same or are similar (e.g., at least a threshold measure of similarity based on a suitable similarity analysis) as RF metrics 301 for a second sector 101, that the first and second sectors 101 have similar attributes. In this manner, ROS 105 may infer, estimate, identify, etc. attributes of a sector 101 with one or more unknown attributes by comparing RF metrics 301 (and/or other attributes) to another sector 101 with known attributes (e.g., the presence of tall buildings, topographical features, UE mobility patterns, etc.).

Process 1100 may further include generating, receiving, and/or modifying (at 1104) channel propagation models 203 indicating particular channel propagation metrics as a function of location. For example, as discussed above, ROS 105 may evaluate channel propagation metrics, such as RSRP values, RSRQ values, SINR values, CQI values, and/or other suitable values (e.g., values derived from or computed based on the above metrics and/or other metrics). Such channel propagation metrics may be received from UEs 107 connected to one or more base stations 103 (e.g., real-world measured or computed metrics), from one or more base stations 103 and/or other wireless network infrastructure elements, and/or may be generated or received based on a simulation of a RAN (e.g., in which channel conditions between one or more UEs 107 and one or more base stations 103 are simulated).

The channel propagation metrics may also include an indication of a geographical location at which such channel propagation metrics were measured and/or simulated. For example, the geographical location may be an absolute location (e.g., latitude and longitude coordinates and/or some other type of indicator of absolute location) and/or a location relative to a reference point (e.g., a distance and/or azimuth angle from a reference point, such as the location of a particular base station 103, a particular reference point (e.g., the center, an edge, etc.) associated with a particular sector 101, etc.). Example representations of channel propagation models 203 are provided above with respect to FIGS. 4-6, depicting particular channel propagation metrics as a function of location within a given sector 101.

Process 1100 may additionally include determining (at 1106) associations between respective sector models 201 and channel propagation models 203. For example, ROS 105 may perform one or more AI/ML techniques, such as deep learning, reinforced or unreinforced machine learning, neural networks, K-means clustering, tree-based ML techniques (e.g., XGBoost, random forest, and/or other tree-based techniques), regression analysis, and/or other suitable techniques to identify particular sets of channel propagation metrics as a function of location (e.g., as indicated by channel propagation models 203) with sectors 101 having particular attributes (e.g., as indicated by sector models 201).

Generally, sectors 101 with relatively similar attributes may exhibit similar channel propagation metrics as a function of location within such sectors 101. For example, a first sector 101 with a ten-story building within 100 meters of a base station 103 implementing a 5G RAT may exhibit similar channel propagation metrics (e.g., as a function of location, such as a function of distance and/or angle from base station 103) as a second sector 101 that also includes a ten-story building within 100 meters of a base station 103 implementing a 5G RAT within the second sector 101. As another example, a first sector 101 with a ten-story building within 100 meters of a base station 103 implementing a 5G RAT may exhibit similar channel propagation metrics (e.g., as a function of location, such as a function of distance and/or angle from base station 103) as a second sector 101 that includes a fifteen-story building within 150 meters of a base station 103 implementing a 5G RAT within the second sector 101. As noted above, GOS 105 may utilize one or more suitable AI/ML techniques to determine a measure of correlation, similarity, etc. between sector models 201 associated with sectors 101 in order to determine channel propagation models 203 (or portions thereof) that are associated with multiple sectors 101 having relatively similar (e.g., within a threshold measure of similarity) attributes.

Process 1100 may also include determining (at 1108) a particular sector model 201 associated with a particular sector 101 based on attributes of the particular sector 101. For example, ROS 105 may evaluate attributes of one or more sectors 101 to determine whether to perform actions to enhance channel propagation metrics with such sectors 101. For example, such evaluation may be performed during a "network planning" phase, in which simulations are performed in a simulated environment to analyze various configurations or configuration changes to a RAN. As another example, such evaluation may be performed on a "live" or "deployed" RAN to identify sectors 101 that are exhibiting channel propagation metrics (or other metrics) below a threshold level. As yet another example, such evaluation may be performed on a "live" or "deployed" RAN to enhance the overall operation of the RAN (e.g., to enhance channel propagation metrics) as an ongoing process, even if channel propagation metrics associated with the RAN are above a threshold level. As noted above, ROS 105 may receive attributes, characteristics, etc. of particular sectors 101 of the RAN from base stations 103 within (or providing wireless service to) sectors 101, UEs 107 within sectors 101, an orchestration platform associated with sectors 101, and/or some other device or system. Examples of types of attributes, characteristics, etc. are discussed above with respect to FIG. 3.

Process 1100 may further include selecting (at 1110) a particular channel propagation model for a particular sector 101 based on one or more sector models 201 determined for sector 101. For example, ROS 105 may identify one or more channel propagation models 203 that were identified (e.g., at 1106) as being associated with one or more sector models 201 associated with sector 101. In some embodiments, ROS 105 may select multiple channel propagation models 203 for a single sector 101. For example, ROS 105 may determine that a given sector model 201 is associated with two example channel propagation models 203: a first channel propagation model 203 for a first portion of sector 101 (e.g., a first set of sub-sectors), and a second channel propagation model 203 for a second portion of sector 101 (e.g., a second set of sub-sectors). In this manner, channel propagation models 203 may be used in a more granular manner than on a per-sector basis.

Process 1100 may additionally include determining (at 1112) a set of actions 205 based on the identified channel propagation model 203 and sector model 201 for sector 101. For example, depending on the attributes, characteristics, etc. of sector 101, different actions 205 may be possible and/or may yield different results in order to increase channel propagation metrics at particular portions of sector 101. For example, one sector 101 may have available transmit power headroom to increase the power of RF transmissions to a particular portion of sector 101, without reducing power of RF transmissions to other portions of sector 101, while another sector 101 may not have such headroom available. In the latter example, one or more different or additional actions 205 may be determined, such as changing the directionality of one or more antennas to point towards a given portion of sector 101.

As another example, such actions 205 may include the identification of increased demand for wireless service at a given location within sector 101. For example, such increased demand may be determined based on an identification of a set of UEs 107 that are, or expected to be, at a given location within sector 101 (e.g., based on one or more predictive models of UE location, based on historical UE locations within sector 101, based on the occurrence of a scheduled event within sector 101 (e.g., a sporting event, a bus departure, a concert, etc.), and/or based on some other type of estimation or prediction). ROS 105 may determine, based on such identification of increased demand, that channel propagation metrics associated with the given location within sector 101 should be increased. In some embodiments, ROS 105 may determine that such increase should be temporary (e.g., based on the end of a scheduled event, based on a set duration after the action 205 is performed, or some other temporary basis). For example, after action 205 is performed, ROS 105 may determine that action 205 should be partially or completely reverted at some later time. In some embodiments, as noted above, other actions 205 may be performed in order to enhance channel propagation metrics within a given sector 101.

Process 1100 may also include implementing (at 1114) the set of actions 205 at sector 101. For example, base station 103 and/or some other device or system within (or providing wireless service to) sector 101 may implement the identified set of actions.

As shown in FIG. 11, some or all of process 1100 may be performed and/or repeated iteratively. For example, some or all of operations 1108-1114 may be repeated and/or performed, in order to continuously (e.g., on an ongoing basis) remediate potential channel propagation issues, and/or otherwise enhance channel propagation metrics, within a given sector 101. That is, the results of implementing (at 1114) particular actions in response to particular channel propagation models 203 associated with particular sector models 201 may be evaluated. Further, the associations between sector models 201, channel propagation models 203, and sets of actions/parameters 205 may be modified (e.g., strengthened or weakened) based on whether particular actions 205 improved channel propagation metrics within sector 101. For example, if a particular action 205 increased channel propagation metrics at a given location within sector 101 (e.g., a location at which increased demand for wireless service is predicted or determined), an affinity score between particular action 205 and an appropriate sector model 201 and/or channel propagation model 203 for sector 101 may be increased. If, on the other hand, a particular action 205 decreased and/or did not affect channel propagation metrics within sector 101, an affinity score between particular action 205 and an appropriate sector model 201 and/or channel propagation model 203 for sector 101 may be decreased, thus reducing or eliminating the likelihood that the same action 205 is selected in future instances of similar types of channel propagation metrics detected at sectors having similar attributes as particular sector 101.

Figure 12:
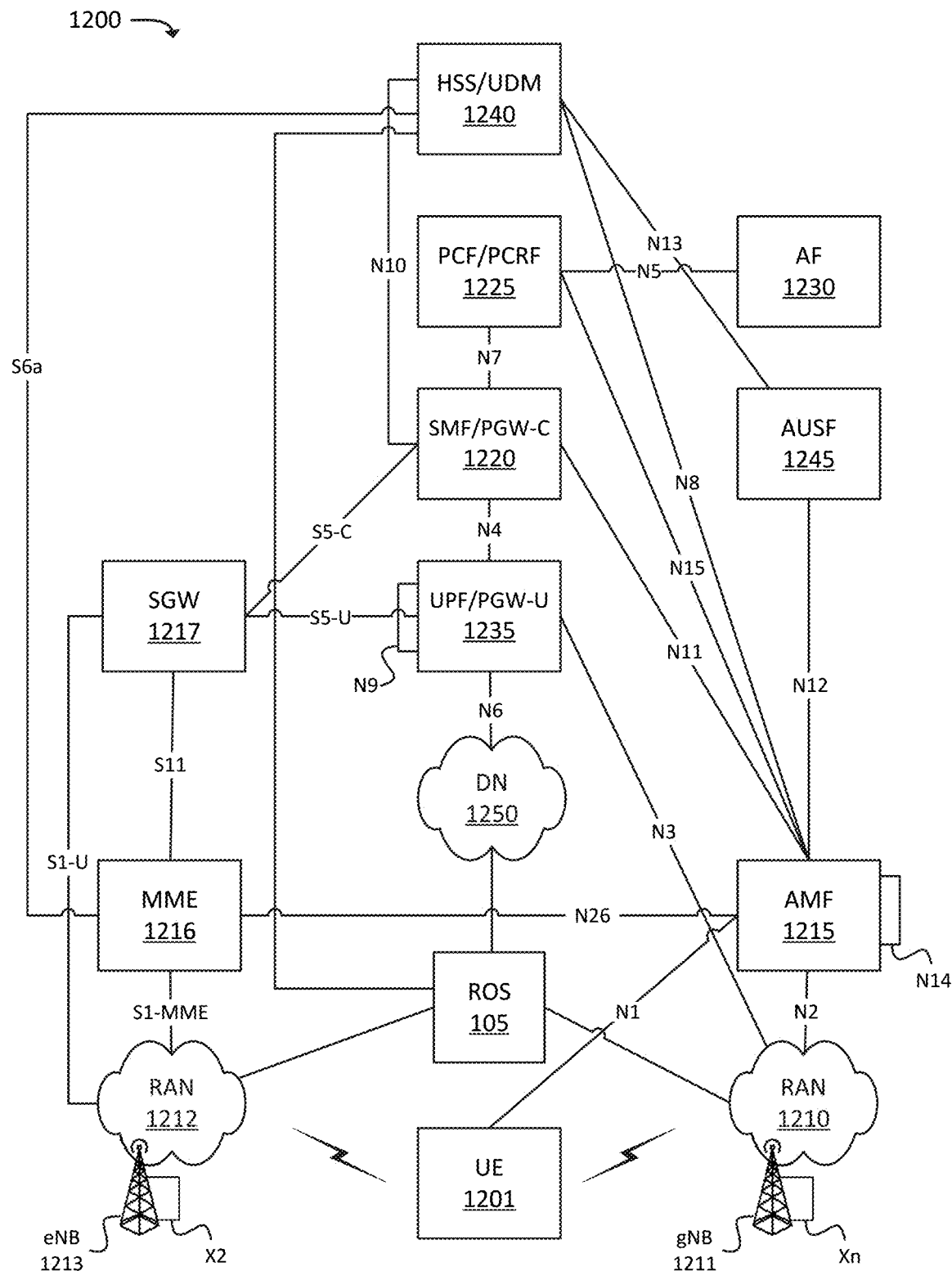
FIG. 12 illustrates an example environment in which one or more embodiments, described herein, may be implemented.

FIG. 12 illustrates an example environment 1200, in which one or more embodiments may be implemented. In some embodiments, environment 1200 may correspond to a Fifth Generation ("5G") network, and/or may include elements of a 5G network. In some embodiments, environment 1200 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1200 may include UE 1201, RAN 1210 (which may include one or more Next Generation Node Bs ("gNBs") 1211), RAN 1212 (which may include one or more one or more evolved Node Bs ("eNBs") 1213), and various network functions such as Access and Mobility Management Function ("AMF") 1215, Mobility Management Entity ("MME") 1216, Serving Gateway ("SGW") 1217, Session Management Function ("SMF")/Packet Data Network ("PDN") Gateway ("PGW")-Control plane function ("PGW-C") 1220, Policy Control Function ("PCF")/Policy Charging and Rules Function ("PCRF") 1225, Application Function ("AF") 1230, User Plane Function ("UPF")/PGW-User plane function ("PGW-U") 1235, Home Subscriber Server ("HSS")/Unified Data Management ("UDM") 1240, and Authentication Server Function ("AUSF") 1245. Environment 1200 may also include one or more networks, such as Data Network ("DN") 1250. Environment 1200 may include one or more additional devices or systems communicatively coupled to one or more networks (e.g., DN 1250), such as ROS 105.

The example shown in FIG. 12 illustrates one instance of each network component or function (e.g., one instance of SMF/PGW-C 1220, PCF/PCRF 1225, UPF/PGW-U 1235, HSS/UDM 1240, and/or 1245). In practice, environment 1200 may include multiple instances of such components or functions. For example, in some embodiments, environment 1200 may include multiple "slices" of a core network, where each slice includes a discrete set of network functions (e.g., one slice may include a first instance of SMF/PGW-C 1220, PCF/PCRF 1225, UPF/PGW-U 1235, HSS/UDM 1240, and/or 1245, while another slice may include a second instance of SMF/PGW-C 1220, PCF/PCRF 1225, UPF/PGW-U 1235, HSS/UDM 1240, and/or 1245). The different slices may provide differentiated levels of service, such as service in accordance with different Quality of Service ("QoS") parameters.

The quantity of devices and/or networks, illustrated in FIG. 12, is provided for explanatory purposes only. In practice, environment 1200 may include additional devices and/or networks, fewer devices and/or networks, different devices and/or networks, or differently arranged devices and/or networks than illustrated in FIG. 12. For example, while not shown, environment 1200 may include devices that facilitate or enable communication between various components shown in environment 1200, such as routers, modems, gateways, switches, hubs, etc. Alternatively, or additionally, one or more of the devices of environment 1200 may perform one or more network functions described as being performed by another one or more of the devices of environment 1200. Devices of environment 1200 may interconnect with each other and/or other devices via wired connections, wireless connections, or a combination of wired and wireless connections. In some implementations, one or more devices of environment 1200 may be physically integrated in, and/or may be physically attached to, one or more other devices of environment 1200.

UE 1201 may include a computation and communication device, such as a wireless mobile communication device that is capable of communicating with RAN 1210, RAN 1212, and/or DN 1250. UE 1201 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 1201 may send traffic to and/or receive traffic (e.g., user plane traffic) from DN 1250 via RAN 1210, RAN 1212, and/or UPF/PGW-U 1235.

RAN 1210 may be, or may include, a 5G RAN that includes one or more base stations (e.g., one or more gNBs 1211), via which UE 1201 may communicate with one or more other elements of environment 1200. UE 1201 may communicate with RAN 1210 via an air interface (e.g., as provided by gNB 1211). For instance, RAN 1210 may receive traffic (e.g., voice call traffic, data traffic, messaging traffic, signaling traffic, etc.) from UE 1201 via the air interface, and may communicate the traffic to UPF/PGW-U 1235, and/or one or more other devices or networks. Similarly, RAN 1210 may receive traffic intended for UE 1201 (e.g., from UPF/PGW-U 1235, AMF 1215, and/or one or more other devices or networks) and may communicate the traffic to UE 1201 via the air interface. In some embodiments, base station 103 may be, may include, and/or may be implemented by one or more gNBs 1211.

RAN 1212 may be, or may include, a LTE RAN that includes one or more base stations (e.g., one or more eNBs 1213), via which UE 1201 may communicate with one or more other elements of environment 1200. UE 1201 may communicate with RAN 1212 via an air interface (e.g., as provided by eNB 1213). For instance, RAN 1210 may receive traffic (e.g., voice call traffic, data traffic, messaging traffic, signaling traffic, etc.) from UE 1201 via the air interface, and may communicate the traffic to UPF/PGW-U 1235, and/or one or more other devices or networks. Similarly, RAN 1210 may receive traffic intended for UE 1201 (e.g., from UPF/PGW-U 1235, SGW 1217, and/or one or more other devices or networks) and may communicate the traffic to UE 1201 via the air interface. In some embodiments, base station 103 may be, may include, and/or may be implemented by one or more eNBs 1213.

AMF 1215 may include one or more devices, systems, Virtualized Network Functions ("VNFs"), etc., that perform operations to register UE 1201 with the 5G network, to establish bearer channels associated with a session with UE 1201, to hand off UE 1201 from the 5G network to another network, to hand off UE 1201 from the other network to the 5G network, manage mobility of UE 1201 between RANs 1210 and/or gNBs 1211, and/or to perform other operations. In some embodiments, the 5G network may include multiple AMFs 1215, which communicate with each other via the N14 interface (denoted in FIG. 12 by the line marked "N14" originating and terminating at AMF 1215).

MME 1216 may include one or more devices, systems, VNFs, etc., that perform operations to register UE 1201 with the EPC, to establish bearer channels associated with a session with UE 1201, to hand off UE 1201 from the EPC to another network, to hand off UE 1201 from another network to the EPC, manage mobility of UE 1201 between RANs 1212 and/or eNBs 1213, and/or to perform other operations.

SGW 1217 may include one or more devices, systems, VNFs, etc., that aggregate traffic received from one or more eNBs 1213 and send the aggregated traffic to an external network or device via UPF/PGW-U 1235. Additionally, SGW 1217 may aggregate traffic received from one or more UPF/PGW-Us 1235 and may send the aggregated traffic to one or more eNBs 1213. SGW 1217 may operate as an anchor for the user plane during inter-eNB handovers and as an anchor for mobility between different telecommunication networks or RANs (e.g., RANs 1210 and 1212).

SMF/PGW-C 1220 may include one or more devices, systems, VNFs, etc., that gather, process, store, and/or provide information in a manner described herein. SMF/PGW-C 1220 may, for example, facilitate in the establishment of communication sessions on behalf of UE 1201. In some embodiments, the establishment of communications sessions may be performed in accordance with one or more policies provided by PCF/PCRF 1225.

PCF/PCRF 1225 may include one or more devices, systems, VNFs, etc., that aggregate information to and from the 5G network and/or other sources. PCF/PCRF 1225 may receive information regarding policies and/or subscriptions from one or more sources, such as subscriber databases and/or from one or more users (such as, for example, an administrator associated with PCF/PCRF 1225).

AF 1230 may include one or more devices, systems, VNFs, etc., that receive, store, and/or provide information that may be used in determining parameters (e.g., quality of service parameters, charging parameters, or the like) for certain applications.

UPF/PGW-U 1235 may include one or more devices, systems, VNFs, etc., that receive, store, and/or provide data (e.g., user plane data). For example, UPF/PGW-U 1235 may receive user plane data (e.g., voice call traffic, data traffic, etc.), destined for UE 1201, from DN 1250, and may forward the user plane data toward UE 1201 (e.g., via RAN 1210, SMF/PGW-C 1220, and/or one or more other devices). In some embodiments, multiple UPFs 1235 may be deployed (e.g., in different geographical locations), and the delivery of content to UE 1201 may be coordinated via the N9 interface (e.g., as denoted in FIG. 12 by the line marked "N9" originating and terminating at UPF/PGW-U 1235). Similarly, UPF/PGW-U 1235 may receive traffic from UE 1201 (e.g., via RAN 1210, SMF/PGW-C 1220, and/or one or more other devices), and may forward the traffic toward DN 1250. In some embodiments, UPF/PGW-U 1235 may communicate (e.g., via the N4 interface) with SMF/PGW-C 1220, regarding user plane data processed by UPF/PGW-U 1235.

HSS/UDM 1240 and AUSF 1245 may include one or more devices, systems, VNFs, etc., that manage, update, and/or store, in one or more memory devices associated with AUSF 1245 and/or HSS/UDM 1240, profile information associated with a subscriber. AUSF 1245 and/or HSS/UDM 1240 may perform authentication, authorization, and/or accounting operations associated with the subscriber and/or a communication session with UE 1201.

DN 1250 may include one or more wired and/or wireless networks. For example, DN 1250 may include an Internet Protocol ("IP")-based PDN, a wide area network ("WAN") such as the Internet, a private enterprise network, and/or one or more other networks. UE 1201 may communicate, through DN 1250, with data servers, other UEs 1201, and/or to other servers or applications that are coupled to DN 1250. DN 1250 may be connected to one or more other networks, such as a public switched telephone network ("PSTN"), a public land mobile network ("PLMN"), and/or another network. DN 1250 may be connected to one or more devices, such as content providers, applications, web servers, and/or other devices, with which UE 1201 may communicate.

ROS 105 may include one or more devices, systems, VNFs, etc. that perform one or more operations described above. For example, ROS 105 may generate and/or maintain sector models 201, channel propagation models 203, and/or sets of actions and/or parameters 205. Further ROS 105 may determine associations between respective sector models 201, channel propagation models 203, and/or sets of actions and/or parameters 205. ROS 105 may identify particular sectors 101 to be remediated, improved, etc., and may identify sector models 201, channel propagation models 203, and/or actions 205 to perform with respect to such sectors 101, as described above. ROS 105 may communicate with gNBs 911 and/or eNBs 913 via an X2 interface, may receive UE information and/or other network information from HSS/UDM 940 via a suitable API or other communication pathway, and/or may communicate with UEs 107 via gNBs 911 and/or eNBs 913.

Figure 13:
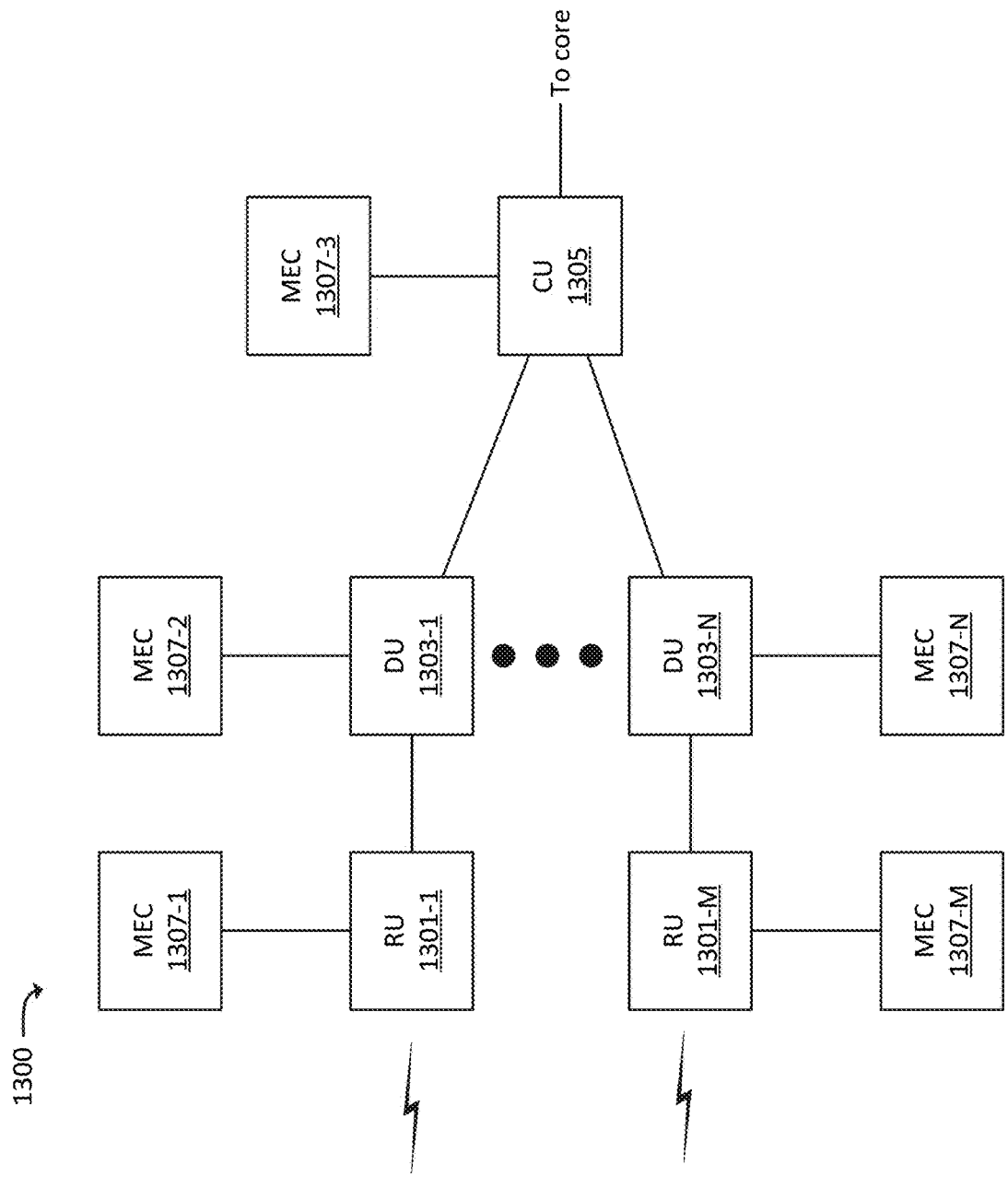
FIG. 13 illustrates an example arrangement of a radio access network ("RAN"), in accordance with some embodiments.

FIG. 13 illustrates an example Distributed Unit ("DU") network 1300, which may be included in and/or implemented by one or more RANs (e.g., RAN 1210, RAN 1212, or some other RAN). In some embodiments, a particular RAN may include one DU network 1300. In some embodiments, a particular RAN may include multiple DU networks 1300. In some embodiments, DU network 1300 may correspond to a particular gNB 1211 of a 5G RAN (e.g., RAN 1210). In some embodiments, DU network 1300 may correspond to multiple gNBs 1211. In some embodiments, DU network 1300 may correspond to one or more other types of base stations of one or more other types of RANs. As shown, DU network 1300 may include Central Unit ("CU") 1305, one or more Distributed Units ("DUs") 1303-1 through 1303-N (referred to individually as "DU 1303," or collectively as "DUs 1303"), and one or more Radio Units ("RUs") 1301-1 through 1301-M (referred to individually as "RU 1301," or collectively as "RUs 1301").

CU 1305 may communicate with a core of a wireless network (e.g., may communicate with one or more of the devices or systems described above with respect to FIG. 12, such as AMF 1215 and/or UPF/PGW-U 1235). In the uplink direction (e.g., for traffic from UEs 1201 to a core network), CU 1305 may aggregate traffic from DUs 1303, and forward the aggregated traffic to the core network. In some embodiments, CU 1305 may receive traffic according to a given protocol (e.g., Radio Link Control ("RLC")) from DUs 1303, and may perform higher-layer processing (e.g., may aggregate/process RLC packets and generate Packet Data Convergence Protocol ("PDCP") packets based on the RLC packets) on the traffic received from DUs 1303.

In accordance with some embodiments, CU 1305 may receive downlink traffic (e.g., traffic from the core network) for a particular UE 1201, and may determine which DU(s) 1303 should receive the downlink traffic. DU 1303 may include one or more devices that transmit traffic between a core network (e.g., via CU 1305) and UE 1201 (e.g., via a respective RU 1301). DU 1303 may, for example, receive traffic from RU 1301 at a first layer (e.g., physical ("PHY") layer traffic, or lower PHY layer traffic), and may process/aggregate the traffic to a second layer (e.g., upper PHY and/or RLC). DU 1303 may receive traffic from CU 1305 at the second layer, may process the traffic to the first layer, and provide the processed traffic to a respective RU 1301 for transmission to UE 1201.

RU 1301 may include hardware circuitry (e.g., one or more RF transceivers, antennas, radios, and/or other suitable hardware) to communicate wirelessly (e.g., via an RF interface) with one or more UEs 1201, one or more other DUs 1303 (e.g., via RUs 1301 associated with DUs 1303), and/or any other suitable type of device. In the uplink direction, RU 1301 may receive traffic from UE 1201 and/or another DU 1303 via the RF interface and may provide the traffic to DU 1303. In the downlink direction, RU 1301 may receive traffic from DU 1303, and may provide the traffic to UE 1201 and/or another DU 1303.

RUs 1301 may, in some embodiments, be communicatively coupled to one or more Multi-Access/Mobile Edge Computing ("MEC") devices, referred to sometimes herein simply as ("MECs") 1307. For example, RU 1301-1 may be communicatively coupled to MEC 1307-1, RU 1301-M may be communicatively coupled to MEC 1307-M, DU 1303-1 may be communicatively coupled to MEC 1307-2, DU 1303-N may be communicatively coupled to MEC 1307-N, CU 1305 may be communicatively coupled to MEC 1307-3, and so on. MECs 1307 may include hardware resources (e.g., configurable or provisionable hardware resources) that may be configured to provide services and/or otherwise process traffic to and/or from UE 1201, via a respective RU 1301.

For example, RU 1301-1 may route some traffic, from UE 1201, to MEC 1307-1 instead of to a core network (e.g., via DU 1303 and CU 1305). MEC 1307-1 may process the traffic, perform one or more computations based on the received traffic, and may provide traffic to UE 1201 via RU 1301-1. In this manner, ultra-low latency services may be provided to UE 1201, as traffic does not need to traverse DU 1303, CU 1305, and an intervening backhaul network between DU network 1300 and the core network. In some embodiments, MEC 1307 may include, and/or may implement, some or all of the functionality described above with respect to ROS 105.

Figure 14:
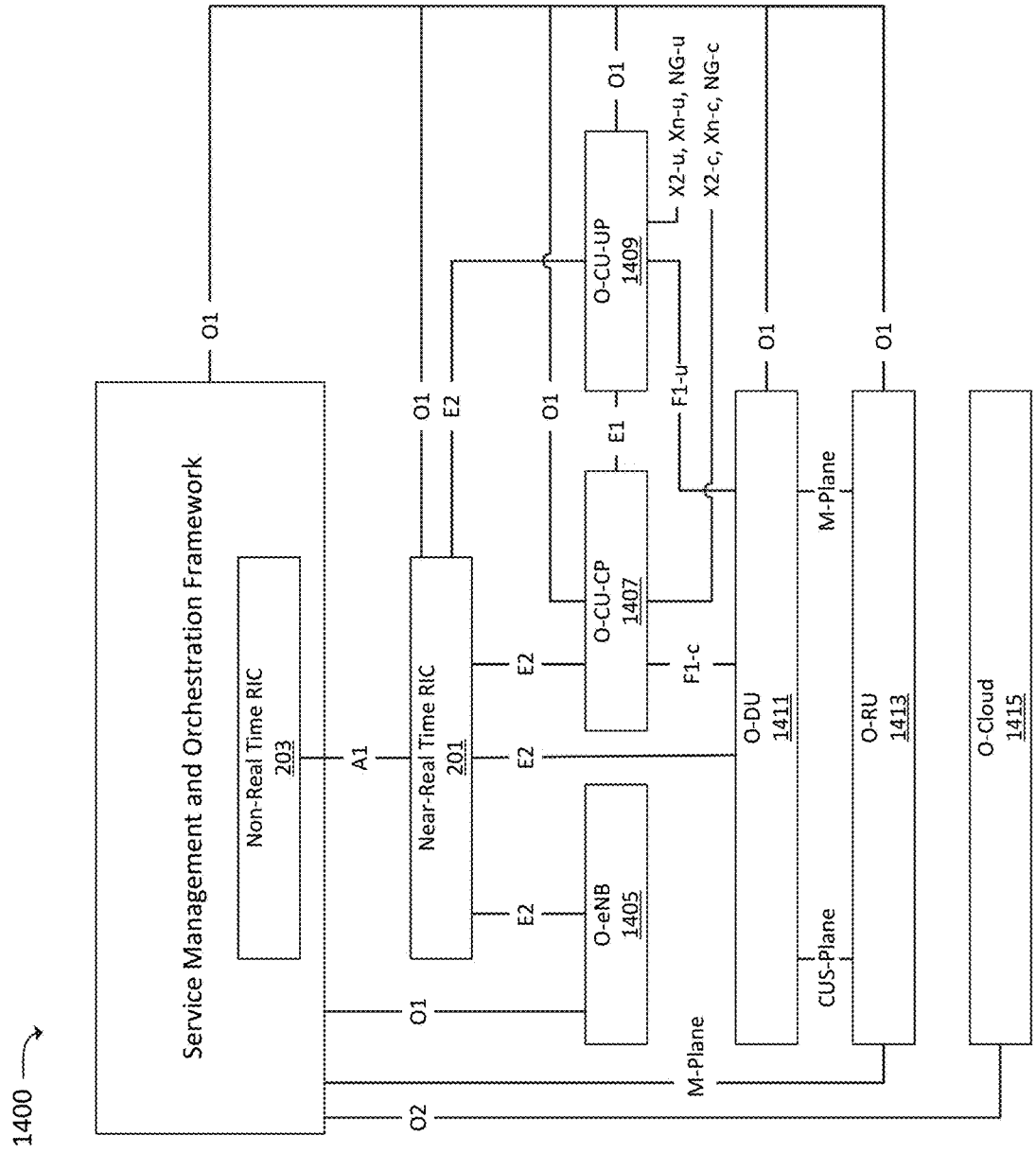
FIG. 14 illustrates an example arrangement of an Open RAN ("O-RAN") environment in which one or more embodiments, described herein, may be implemented.

FIG. 14 illustrates an example O-RAN environment 1400, which may correspond to RAN 1210, RAN 1212, and/or DU network 1300. For example, RAN 1210, RAN 1212, and/or DU network 1300 may include one or more instances of O-RAN environment 1400, and/or one or more instances of O-RAN environment 1400 may implement RAN 1210, RAN 1212, DU network 1300, and/or some portion thereof. As shown, O-RAN environment 1400 may include Non-Real Time Radio Intelligent Controller ("RIC") 1401, Near-Real Time RIC 1403, O-eNB 1405, O-CU-Control Plane ("O-CU-CP") 1407, O-CU-User Plane ("O-CU-UP") 1409, O-DU 1411, O-RU 1413, and O-Cloud 1415. In some embodiments, O-RAN environment 1400 may include additional, fewer, different, and/or differently arranged components.

In some embodiments, some or all of the elements of O-RAN environment 1400 may be implemented by one or more configurable or provisionable resources, such as virtual machines, cloud computing systems, physical servers, and/or other types of configurable or provisionable resources. In some embodiments, some or all of O-RAN environment 1400 may be implemented by, and/or communicatively coupled to, one or more MECs 1307.

Non-Real Time RIC 1401 and Near-Real Time RIC 1403 may receive performance information (and/or other types of information) from one or more sources, and may configure other elements of O-RAN environment 1400 based on such performance or other information. For example, Near-Real Time MC 1403 may receive performance information, via one or more E2 interfaces, from O-eNB 1405, O-CU-CP 1407, and/or O-CU-UP 1409, and may modify parameters associated with O-eNB 1405, O-CU-CP 1407, and/or O-CU-UP 1409 based on such performance information. Similarly, Non-Real Time MC 1401 may receive performance information associated with O-eNB 1405, O-CU-CP 1407, O-CU-UP 1409, and/or one or more other elements of O-RAN environment 1400 and may utilize machine learning and/or other higher level computing or processing to determine modifications to the configuration of O-eNB 1405, O-CU-CP 1407, O-CU-UP 1409, and/or other elements of O-RAN environment 1400. In some embodiments, Non-Real Time RIC 1401 may generate machine learning models based on performance information associated with O-RAN environment 1400 or other sources, and may provide such models to Near-Real Time RIC 1403 for implementation.

O-eNB 1405 may perform functions similar to those described above with respect to eNB 1213. For example, O-eNB 1405 may facilitate wireless communications between UE 1201 and a core network. O-CU-CP 1407 may perform control plane signaling to coordinate the aggregation and/or distribution of traffic via one or more DUs 1303, which may include and/or be implemented by one or more O-DUs 1411, and O-CU-UP 1409 may perform the aggregation and/or distribution of traffic via such DUs 1303 (e.g., O-DUs 1411). O-DU 1411 may be communicatively coupled to one or more RUs 1301, which may include and/or may be implemented by one or more O-RUs 1413. In some embodiments, O-Cloud 1415 may include or be implemented by one or more MECs 1307, which may provide services, and may be communicatively coupled, to O-CU-CP 1407, O-CU-UP 1409, O-DU 1411, and/or O-RU 1413 (e.g., via an O1 and/or O2 interface).

Figure 15:
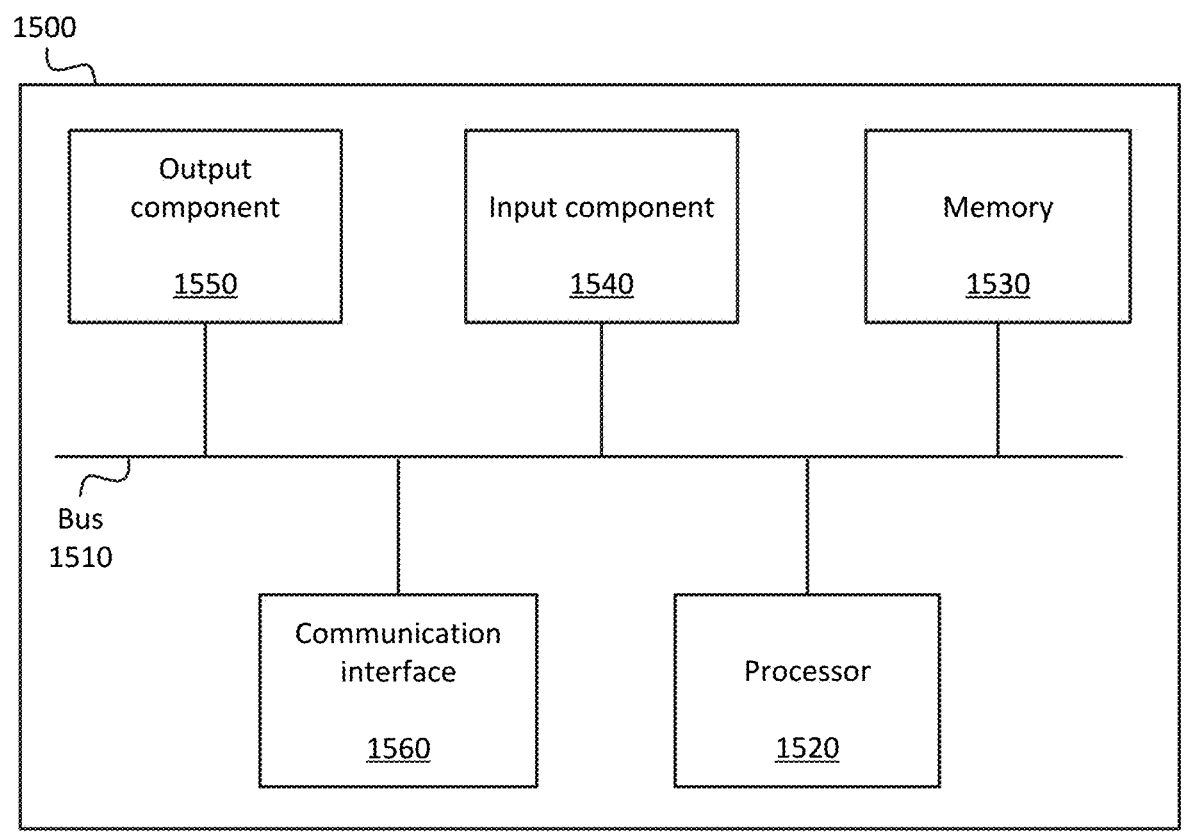
FIG. 15 illustrates example components of one or more devices, in accordance with one or more embodiments described herein.

FIG. 15 illustrates example components of device 1500. One or more of the devices described above may include one or more devices 1500. Device 1500 may include bus 1510, processor 1520, memory 1530, input component 1540, output component 1550, and communication interface 1560. In another implementation, device 1500 may include additional, fewer, different, or differently arranged components.

Bus 1510 may include one or more communication paths that permit communication among the components of device 1500. Processor 1520 may include a processor, microprocessor, or processing logic that may interpret and execute instructions. Memory 1530 may include any type of dynamic storage device that may store information and instructions for execution by processor 1520, and/or any type of non-volatile storage device that may store information for use by processor 1520.

Input component 1540 may include a mechanism that permits an operator to input information to device 1500 and/or other receives or detects input from a source external to 1540, such as a touchpad, a touchscreen, a keyboard, a keypad, a button, a switch, a microphone or other audio input component, etc. In some embodiments, input component 1540 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1550 may include a mechanism that outputs information to the operator, such as a display, a speaker, one or more light emitting diodes ("LEDs"), etc.

Communication interface 1560 may include any transceiver-like mechanism that enables device 1500 to communicate with other devices and/or systems. For example, communication interface 1560 may include an Ethernet interface, an optical interface, a coaxial interface, or the like. Communication interface 1560 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1500 may include more than one communication interface 1560. For instance, device 1500 may include an optical interface and an Ethernet interface.

Device 1500 may perform certain operations relating to one or more processes described above. Device 1500 may perform these operations in response to processor 1520 executing software instructions stored in a computer-readable medium, such as memory 1530. A computer-readable medium may be defined as a non-transitory memory device. A memory device may include space within a single physical memory device or spread across multiple physical memory devices. The software instructions may be read into memory 1530 from another computer-readable medium or from another device. The software instructions stored in memory 1530 may cause processor 1520 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-11), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
identify attributes of a particular portion of a radio access network ("RAN");
select a particular model, from a plurality of models that are each associated with a respective set of RAN attributes, based on a comparison of the identified attributes of the particular portion of the RAN to attributes of the plurality of models;
determine predicted channel propagation metrics associated with the particular portion of the RAN based on the selected particular model;
identify a particular location, within the particular portion of the RAN, that is associated with at least a threshold level of demand for wireless service; and
modify one or more configuration parameters associated with the particular portion of the RAN based on the determined predicted channel propagation metrics within the particular portion of the RAN, wherein modifying the one or more configuration parameters includes increasing transmission power of radio frequency ("RF") signals transmitted to one or more locations, including the particular location, within the particular portion of the RAN.

2. The device of claim 1, wherein the particular model is a first model, wherein the plurality of models is a first plurality of models, wherein the one or more processors are further configured to:
identify a second model that is associated with the selected first model; and
determine the predicted channel propagation metrics associated with the particular portion of the RAN based on the identified second model.

3. The device of claim 2, wherein the second model indicates channel propagation metrics as a function of geographical location.

4. The device of claim 1, wherein the threshold level of demand includes at least one of:
a threshold quantity of User Equipment ("UEs") that have been determined to be located within a particular proximity of the particular location within the particular portion of the RAN, or
a threshold quantity of UEs that are predicted to be located within the particular proximity of the particular location within the particular portion of the RAN, as indicated by one or more predictive UE location models.

5. The device of claim 1, wherein modifying the one or more configuration parameters includes modifying a directionality of one or more antennas transmitting radio frequency ("RF") signals to one or more locations within the particular portion of the RAN.

6. The device of claim 1, wherein the one or more models are generated using one or more artificial intelligence/machine learning ("AI/ML") techniques based on RAN attributes received over time.

7. The method of claim 6, wherein the RAN attributes are based on measurement reports received from User Equipment ("UEs") located within the particular portion of the RAN.

8. A non-transitory computer-readable medium, storing a plurality of processor-executable instructions to:

identify attributes of a particular portion of a radio access network ("RAN");

select a particular model, from a plurality of models that are each associated with a respective set of RAN attributes, based on a comparison of the identified attributes of the particular portion of the RAN to attributes of the plurality of models;

determine predicted channel propagation metrics associated with the particular portion of the RAN based on the selected particular model;

identify a particular location, within the particular portion of the RAN, that is associated with at least a threshold level of demand for wireless service; and modify one or more configuration parameters associated with the particular portion of the RAN based on the determined predicted channel propagation metrics within the particular portion of the RAN, wherein modifying the one or more configuration parameters includes increasing transmission power of radio frequency ("RF") signals transmitted to one or more locations, including the particular location, within the particular portion of the RAN.

9. The non-transitory computer-readable medium of claim 8, wherein the particular model is a first model, wherein the plurality of models is a first plurality of models, wherein the plurality of processor-executable instructions further include processor-executable instructions to:

identify a second model that is associated with the selected first model; and determine the predicted channel propagation metrics associated with the particular portion of the RAN based on the identified second model.

10. The non-transitory computer-readable medium of claim 9, wherein the second model indicates channel propagation metrics as a function of geographical location.

11. The non-transitory computer-readable medium of claim 8, wherein the threshold level of demand includes at least one of:

a threshold quantity of User Equipment ("UEs") that have been determined to be located within a particular proximity of the particular location within the particular portion of the RAN, or a threshold quantity of UEs that are predicted to be located within the particular proximity of the particular location within the particular portion of the RAN, as indicated by one or more predictive UE location models.

12. The non-transitory computer-readable medium of claim 8, wherein modifying the one or more configuration parameters includes modifying a directionality of one or more antennas transmitting radio frequency ("RF") signals to one or more locations within the particular portion of the RAN.

13. The non-transitory computer-readable medium of claim 8, wherein the one or more models are generated using one or more artificial intelligence/machine learning ("AI/ML") techniques based on RAN attributes received over time.

14. The method of claim 13, wherein the RAN attributes are based on measurement reports received from User Equipment ("UEs") located within the particular portion of the RAN.

15. A method, comprising:

identifying attributes of a particular portion of a radio access network ("RAN");

selecting a particular model, from a plurality of models that are each associated with a respective set of RAN attributes, based on a comparison of the identified attributes of the particular portion of the RAN to attributes of the plurality of models;

determining predicted channel propagation metrics associated with the particular portion of the RAN based on the selected particular model;

identifying a particular location, within the particular portion of the RAN, that is associated with at least a threshold level of demand for wireless service; and modifying one or more configuration parameters associated with the particular portion of the RAN based on the determined predicted channel propagation metrics within the particular portion of the RAN, wherein modifying the one or more configuration parameters includes increasing transmission power of radio frequency ("RF") signals transmitted to one or more locations, including the particular location, within the particular portion of the RAN.

16. The method of claim 15, wherein the particular model is a first model, wherein the plurality of models is a first plurality of models, the method further comprising:

identifying a second model, that indicates channel propagation metrics as a function of geographical location, that is associated with the selected first model; and determining the predicted channel propagation metrics associated with the particular portion of the RAN based on the identified second model.

17. The method of claim 15, wherein the threshold level of demand includes at least one of:

a threshold quantity of User Equipment ("UEs") that have been determined to be located within a particular proximity of the particular location within the particular portion of the RAN, or a threshold quantity of UEs that are predicted to be located within the particular proximity of the particular location within the particular portion of the RAN, as indicated by one or more predictive UE location models.

18. The method of claim 15, wherein modifying the one or more configuration parameters includes modifying a directionality of one or more antennas transmitting radio frequency ("RF") signals to one or more locations within the particular portion of the RAN.

19. The method of claim 15, wherein the one or more models are generated using one or more artificial intelligence/machine learning ("AI/ML") techniques based on RAN attributes received over time.

20. The method of claim 19, wherein the RAN attributes are based on measurement reports received from User Equipment ("UEs") located within the particular portion of the RAN.

* * * * *